(12) United States Patent
Patolsky et al.

(10) Patent No.: US 8,475,968 B2
(45) Date of Patent: Jul. 2, 2013

(54) DIRECT LIQUID FUEL CELL HAVING HYDRAZINE OR DERIVATIVES THEREOF AS FUEL

(75) Inventors: Fernando Patolsky, Rechovot (IL); Boris Filanovsky, Jerusalem (IL); Eran Granot, Moshav Even Sapir (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 0 days.

(21) Appl. No.: 12/988,517

(22) PCT Filed: Nov. 12, 2009

(86) PCT No.: PCT/IL2009/001067
§ 371 (c)(1), (2), (4) Date: Oct. 19, 2010

(87) PCT Pub. No.: WO2010/055511
PCT Pub. Date: May 20, 2010

(65) Prior Publication Data
US 2011/0053022 A1    Mar. 3, 2011

Related U.S. Application Data

(60) Provisional application No. 61/230,764, filed on Aug. 3, 2009, provisional application No. 61/113,611, filed on Nov. 12, 2008.

(51) Int. Cl.
*H01M 4/38* (2006.01)
*H01M 8/10* (2006.01)

(52) U.S. Cl.
USPC ............ 429/485; 429/504; 429/484; 429/523

(58) Field of Classification Search
USPC ................... 429/504, 484, 485, 523
IPC ...................... H01M 8/22,8/10, 4/38
See application file for complete search history.

(56) References Cited

U.S. PATENT DOCUMENTS

| | | | |
|---|---|---|---|
| 3,410,729 A | 11/1968 | Manion | |
| 3,519,487 A | 7/1970 | Wolf et al. | |

(Continued)

FOREIGN PATENT DOCUMENTS

| | | | |
|---|---|---|---|
| CN | 101339999 | * | 1/2009 |
| EP | 1843416 | | 10/2007 |

(Continued)

OTHER PUBLICATIONS

International Search Report and the Written Opinion Dated Mar. 26, 2010 From the International Searching Authority Re.: Application No. PCT/IL2009/001067.

(Continued)

*Primary Examiner* — Basia Ridley
*Assistant Examiner* — Heng Chan

(57) ABSTRACT

A fueled cell system comprising: an anode compartment comprising a compound having the formula R1R2N—NR3R4, a salt, a hydrate or a solvate thereof, as fuel, and a catalyst layer which comprises copper or a copper alloy; a cathode compartment comprising an oxidant; and a separator interposed between said cathode and said anode compartments, wherein each of R1-R4 is independently selected from the group consisting of hydrogen, alkyl, alkenyl, alkynyl, heteroalicyclic, alkoxy, carboxy, ketone, amide, hydrazide and amine, provided that at least one of R1-R4 is hydrogen.

35 Claims, 8 Drawing Sheets

U.S. PATENT DOCUMENTS

| | | | |
|---|---|---|---|
| 4,001,040 | A | 1/1977 | Fukuda et al. |
| 7,285,142 | B1 | 10/2007 | Mohajeri et al. |
| 7,320,842 | B2 | 1/2008 | Ozaki et al. |
| 7,544,837 | B2 | 6/2009 | Blacquiere et al. |
| 2003/0175580 | A1* | 9/2003 | Ozaki et al. ............ 429/44 |
| 2005/0106430 | A1* | 5/2005 | Yamada et al. ............ 429/21 |
| 2005/0266281 | A1 | 12/2005 | Adams et al. |
| 2007/0128475 | A1 | 6/2007 | Blacquiere et al. |
| 2007/0151153 | A1 | 7/2007 | Xu et al. |
| 2007/0227300 | A1 | 10/2007 | McGrath et al. |
| 2008/0124600 | A1 | 5/2008 | Shimoyamada et al. |
| 2011/0053022 | A1 | 3/2011 | Patolsky et al. |

FOREIGN PATENT DOCUMENTS

| | | | |
|---|---|---|---|
| GB | 1014232 | | 12/1965 |
| GB | 1165851 | | 10/1969 |
| JP | 2008293762 | A * | 12/2008 |
| WO | WO 2006063992 | A2 * | 6/2006 |
| WO | WO 2010/055512 | | 5/2010 |

OTHER PUBLICATIONS

International Search Report and the Written Opinion Dated Mar. 31, 2010 From the International Searching Authority Re.: Application No. PCT/IL2009/001068.

Demirci et al. "Sodium Borohydride Versus Ammonia Borane, in Hydrogen Storage and Direct Fuel Cell Applications", Energy & Environmental Science, 2: 627-637, 2009.

Logan et al. "Microbial Challenges and Fuel Cells-Applications. Harnessing the Metabolic Activity of Bacteria Can Provide Energy for a Variety of Applications, Once Technical and Cost Obstacles Are Overcome", Environmental Science & Technology, p. 5172-5180, Sep. 1, 2006.

Xu et al. "Catalytic Activities of Non-Noble Metals for Hydrogen Generation From Aqueous Ammonia-Borane at Room Temperature", Journal of Power Sources, XP002573446, 163: 364-370, Oct. 27, 2006. Abstract, p. 365, 369, Table 1.

Corey et al. "Chemistry of Diimide. II. Stereochemistry of Hydrogen Transfer to Carbon-Carbon Multiple Bonds", Journal of the American Chemical Society, JACS, 83(13): 2957-2958, Jul. 5, 1961.

Jiang et al. "Catalytic Effect of Nanogold on Cu(II)-N2H4 Reaction and Its Application to Resonance Scattering Immunoassay", Analytical Chemistry, 80(22): 8681-8687, Nov. 15, 2008.

Karim-Nezhad et al. "Copper (Hydr)Oxide Modified Copper Electrode for Electrocatalytic Oxidation of Hydrazine in Alkaline Media", Electrochimica Acta, 54: 5721-5726, 2009.

Lin et al. "Cupric Ion Catalyzed Diimide Production From the Reaction Between Hydrazine and Hydrogen Peroxide", Applied Catalysis A: General, 263: 27-32, 2004.

Yamada et al. "Potential Application of Anion-Exchange Membrane for Hydrazine Fuel Cell Electrolyte", Electrochemistry Communications, 5: 892-896, 2003.

Zhang et al. "A High Performance Anion Exchange Membrane-Type Ammonia Borane Fuel Cell", Journal of Power Sources, 182: 515-519, 2008.

Zhang et al. "A New Fuel Cell Using Aqueous Ammonia-Borane as the Fuel", Journal of Power Sources, 168: 167-171, 2007.

Preliminary Report on Patentability Dated May 26, 2011 From the International Bureau of WIPO Re. Application No. PCT/IL2009/001067.

Preliminary Report on Patentability Dated May 26, 2011 From the International Bureau of WIPO Re. Application No. PCT/IL2009/001068.

Jiang et al. "Catalytic Effect of Nanogold on Cu(II)-N2H4 Reaction and Its Application to Resonance Scattering Immunoassay", Analytical Chemistry, 80(22): 8681-8687, Nov. 15, 2008.

Official Action Dated Feb. 28, 2012 From the US Patent and Trademark Office Re. U.S. Appl. No. 12/988,518.

Official Action Dated Sep. 18, 2012 From the US Patent and Trademark Office Re. U.S. Appl. No. 12/988,518.

\* cited by examiner

DIRECT LIQUID FUEL CELL HAVING HYDRAZINE OR DERIVATIVES THEREOF AS FUEL

RELATED APPLICATIONS

This Application is a National Phase of PCT Patent Application No. PCT/IL2009/001067 having International filing date of Nov. 12, 2009, which claims the benefit of U.S. Provisional Patent Application Nos. 61/230,764 filed on August 3, 2009, and 61/113,611 filed on November 12, 2008. The contents of the above Applications are all incorporated herein by reference.

FIELD AND BACKGROUND OF THE INVENTION

The present invention, in some embodiments thereof, relates to energy conversion and, more particularly, but not exclusively, to a direct liquid fuel cell system, which utilizes hydrazine or derivatives thereof as fuel, and to applications employing a fuel cell system.

A fuel cell (FC) is an electrochemical device that continuously converts chemical energy directly to electrical energy as long as a fuel (commonly hydrogen, or hydrogen-containing compounds) and an oxidant (commonly oxygen) are supplied. One of the main advantages of fuel cells is their high energy density (typically 4,000-9,000 Wh/kg), which is about 18 times higher than conventional electrochemical power sources (such as, for example, Pb—$PbO_2$; Zn—$O_2$; Zn—Ag; Ni—Cd; Li-ion etc.).

Fuel cells are characterized by high efficiency compared to internal combustion engines. In addition, fuel cells are ecologically friendly and several types can function at temperatures as high as 100° C.

The development of fuel cells is one of the main directions in the field of new power engineering. Several types of fuel cells based on $H_2/O_2$, phosphoric acid, molten carbonate, alkaline, proton exchange membrane, direct methanol and solid oxide were developed in the last two decades [Carrette et al., *ChemPhysChem.* 2000, 1, 162; Springer et al., *J. Electrochem Soc.* 1991, 8, 2334; Atkinson et al., *Nature,* 2004, 3, 17; Steele and Heinzel, *Nature,* 2001, 14, 345]. However, these fuel cells are still far from mass production due to multiple practical limitations.

Some of the obstacles associated with fuel cell development include complex electrode and cell design, catalysts poisoning and mechanical instability, high catalyst cost, low potential and slow oxidation kinetic.

In the last years, research efforts were focused on development of direct liquid fuel cells utilizing hydrogen-containing compounds such as methanol, sodium borohydride, ammonia-borane and hydrazine [see, for example, Yamada et al. *J. Pow. Sour.* 2003, 122, 132-137; Evans and Kordesch, *Science,* 1967, 158, 1148-1152; Asazawa, et al., *J. Electrochem. Soc.* 2009, 156, B509; Yamada et al, *J. Pow. Sour.* 2003, 115, 236; and Jamda at al. *Electrochem. Commun.* 2003, 5, 892-896]. Hydrazine (abbreviated herein and in the art as Hz) based direct liquid fuel cells (DLFC) which functionalize at room temperature were developed in the early 60s. Hydrazine is a low cost powerful fuel, and is a hydrogen-rich compound (12.5%), similar to methanol, which contains more hydrogens compared to sodium borohydride (10.6%).

Hydrazine is considered a hazardous compound, both in its pure form (as $N_2H_4$) and as a monohydrate ($N_2H_4.H_2O$). Yet, hydrazine is non-explosive and non-toxic in diluted aqueous solutions. Moreover, several hydrazine salts, such as, for example, $N_2H_4.H_2SO_4$ are reported as prospective anticancer drugs [see, for example, Upton et al. *Tren. Pharm. Sci.* 2001, 22, 140-146].

The basic sources of hydrazine in nature are unlimited ($N_2$ and $H_2$) and the recycling of hydrazine from its basic elements ($N_2$ and $H_2$) is relatively simple. In addition, hydrazine decomposition results in byproducts, nitrogen ($N_2$) and water ($H_2O$), which are ecologically friendly.

The electrochemical oxidation of hydrazine in a basic solution produces four electrons, nitrogen gas ($N_2$) and water, as presented in Equation 1 hereinbelow:

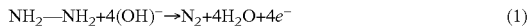

$$NH_2-NH_2 + 4(OH)^- \rightarrow N_2 + 4H_2O + 4e^- \qquad (1)$$

The standard potential of hydrazine oxidation (E°) corresponds to −1.21 V, its theoretical specific electrical capacity corresponds to 3.35 KAh/kg and its specific theoretical power (W) corresponds to 4.05 KWh/kg (3,350·1.21).

The electrochemical properties of hydrazine in alkaline solutions were investigated in the last three decades using different metal catalysts such as platinum (Pt), palladium (Pd), Nickel (Ni), cobalt (Co), gold (Au), silver (Ag) and mercury (Hg).

Amongst the tested metals, Co, Ni and especially Pt-group metals (PGM) were found to perform as the best catalysts for the electro-oxidation of hydrazine.

The use of Pt and Pt-group metals in large scale for commercial fuel cells is limited by cost and practical considerations, imposed by easy poisoning of such electrodes. Cobalt catalyst is characterized by poor stability over time, whereby Ni catalysts produce relatively low current density, 10 times lower than that produced in the presence of Co catalysts. Au and Ag catalysts produce high over-potential ($E_{OP}$) of about 500 mV, compared to Pt catalysts, and Hg catalysts produce $E_{OP}$ higher than 800 mV, compared to Pt catalysts.

Asazawa et al. [*Angewandte Chemie International Edition,* Vol. 46, issue 42, pages 8024-8027] disclose a platinum-free direct hydrazine-based fuel cell, which uses an anion-exchange polymer electrolyte, and cobalt or nickel electrodes, and which exhibits performance that is comparable to that of hydrogen polymer electrolyte fuel cell (PEFC) and exceeds that of direct methanol fuel cell (DMFC).

Copper (Cu) anode catalysts have also been tested in hydrazine-based half-cells. Asazawa et al. [*J. Pow. Sour.* 2009, 191, 362] have tested various catalysts for the electro-oxidation of hydrazine and of hydrazine derivatives and have shown that a Cu catalyst is inferior to cobalt, platinum and other catalysts. Asazawa et al. have reported that a Cu catalyst exhibits poor catalytic performance in comparison to Co and Ni, and that a Cu catalyst is characterized by $E_{OCP}$ value which is more positive compared to Pt, and, in addition, it was shown that the Cu electrode loses its activity upon applying a potential above −0.8 V vs. SHE (standard hydrogen electrode)

Asazawa et al. further reported on a Pt-free hydrazine-based fuel cell, which utilizes hydrazone for generating hydrazine in situ via hydrolysis [see, www.greencarcongress.com/2007/09/daihatsu-develo.html].

U.S. Patent Application No. 2008/0145733, also by Asazawa et al., discloses fuel cells operated using hydrazine and other amine and hydrogen containing compounds as fuel and a cobalt-containing catalyst layer.

Ghasem Karim-Nezhad et al. [*Electrochimica Acta* 54 (2009)5721-5726] disclose copper (hydr)oxide modified copper electrode for electrocatalytic oxidation of hydrazine in alkaline media. The modified electrode showed improved stability to corrosion and an improved electrochemical performance (a negative shift of about 120 mV as compared to a bare copper electrode). The disclosed Cu modified electrode, however, operates at a working potential of +0.2 V, which is not suitable for fuel cell applications (for fuel cell application an anode potential of at least −0.5 V is needed).

Some background art concerning interactions between hydrazine and copper(II) ions includes Zhiliang Jiang et al. [*Anal. Chem.* 2008, 80, 8681-8687], which report that Cu(II) ions serve as catalysts for homogenous Hz decomposition.

Fuel cell systems operating with hydrazine as a fuel and various oxidants have been taught. Commonly used oxidants include, for example, air (for oxygen supply), nitrous acid, and hydrogen peroxide.

The theoretical standard potential (E°) of a hydrazine/hydrogen peroxide fuel cell ($N_2H_4/H_2O_2$) corresponds to 2.99 V (1.21+1.78). Accordingly, the specific theoretical power (W) of such a cell corresponds to 12.1 KWh/kg (4,050·2.99). The efficiency of a $N_2H_4/H_2O_2$ direct liquid fuel cell in about two times higher compared to gasoline engines.

U.S. Pat. No. 3,410,729 teaches a fuel cell system operated by supplying hydrazine to a carbon or nickel anode and supplying hydrogen peroxide to a carbon or nickel cathode.

U.S. Pat. No. 3,811,949 discloses a hydrazine-based fuel cell system comprising metal alloys (e.g., amalgams) as catalysts and oxygen as the oxidant. The main disadvantage in this fuel cell is the use of dangerous mercury contain electrode.

Electrochemical hydrazine sensors were also developed in the last decades [see, for example, Abbaspour and Kamyabi; *J. Electroanal. Chem.* 2005, 576, 73-83; Ozoemena and Nyokong; *Talanta,* 2005, 162-168; Karim-Nezhad and Jafarloo, *Electrochimica Acta;* 2009, 54, 5721-5726]. These electrochemical sensors utilize as catalysts noble metals, transition metals, organic and inorganic complexes, oxides, metal phthalocyanides, metal porphyrines, and more.

Several publications have reported that $CuSO_4//Cu^{(II)}$ is an effective promoter for homogenous oxidation of hydrazine [see, for example, J. Ward, *J. Am. Chem. Soc.* 1976, 98, 7; J. Corey. *J. Am.; Chem. Soc.* 1961, 83, 2957; J. Rempel, *Appl. Catalysis A*: General, 2004, 263, 27; Z. Jiang. *Anal. Chem.* 2008, 80, 8681].

Many electrochemical $H_2O_2$ sensors were fabricated, based on different electron mediators such as Prussian blue [Arkady et al. Anal. Chem., 1995, 67 (14), pp 2419-2423], ferrocene (FeC) [Mulchandani et al., Anal. Chem. 1995, 67, 94-100] and others [see, for example, A. Shinishiro; Chem. Sens, v.21 sup.B (2005) 61], however, the methodologies utilizing such catalysts produced a relatively low current.

Shukla et al. described the use of Prussian blue (PB) as an inorganic electron-transfer mediator (on carbon black; C/PB and polymer) as a catalyst for $H_2O_2$ reduction in a $SB/H_2O_2$ fuel cell [Shukla at al., J. Power sources, 2008, 178, 86]. The taught C/PB electrode was associated with a complicated fabrication protocol and a modest current density of about 35 mA/cm².

Ferrocene is known as a potent electron-transfer mediator [see, for example, Anthony et al., Anal. Chem., 1984, 56, 667-671; Gagne et al., Inorg. Chem. 1980, 19, 2854-2855]. Ferrocene is chemically stable in acid solutions and is characterized by good absorption to carbon materials (via π-π interaction).

Attempts to adapt C/Fc for fuel cell technology have been described [see, for example, U.S. Pat. No. 7,320,842; and K. Gong, Science, 2009, 223, 760]. The described methodologies, however, involved a treatment at a temperature of 700° C., which results in decomposition of the C/Fc catalyst.

Additional art includes Logan B. E. and Regan J. M., Environmental Science & Technology, Sep. 1, 2006, 5172-5180.

PCT Patent Application entitled "A DIRECT LIQUID FUEL CELL HAVING AMMONIA BORANE OR DERIVATIVES THEREOF AS FUEL", having Attorney's Docket No. 47113, by the present inventors, which is co-filed on the same date as the instant application, teaches fuel cell systems which utilize ammonia borane as fuel, and a non-noble metal catalyst as at least one of the anode catalyst and the cathode catalyst. Such fuel cells, which comprise copper catalysts, including catalysts made of copper nanoparticles, are described. This PCT patent application claims priority from U.S. Provisional Patent Application No. 60/113,611, filed Nov. 12, 2008, and from U.S. Provisional Patent Application No. 61/230,764, filed Aug. 3, 2009, the teachings of which are incorporated by reference as if fully set forth herein.

SUMMARY OF THE INVENTION

The present invention, in some embodiments thereof, relates to a novel liquid fuel cell and, more particularly, but not exclusively, to a direct liquid fuel cell (DLFC), which is based on hydrazine and/or derivatives thereof as fuel and which can operate in the presence of non-noble metal catalysts in one of both of the anode and cathode in the cell, and which alternatively, or in addition, utilizes a peroxide as an oxidant.

According to an aspect of some embodiments of the invention there is provided a fuel cell system comprising: an anode compartment comprising a compound having the formula $R_1R_2N—NR_3R_4$, a salt, a hydrate or a solvate thereof, as fuel, and a catalyst layer which comprises copper or a copper alloy; a cathode compartment comprising an oxidant; and a separator interposed between the cathode and the anode compartments, wherein each of $R_1$-$R_4$ is independently selected from the group consisting of hydrogen, alkyl, alkenyl, alkynyl, heteroalicyclic, alkoxy, carboxy, ketone, amide, hydrazide and amine, provided that at least one of $R_1$-$R_4$ is hydrogen.

According to some embodiments of the invention, the oxidant is a peroxide.

According to some embodiments of the invention, the peroxide is hydrogen peroxide.

According to some embodiments of the invention, the copper is in a form selected from the group consisting of a plate, a mesh and particles.

According to some embodiments of the invention, the copper comprises copper nanoparticles.

According to some embodiments of the invention, the nanoparticles have a form selected from the group consisting of round-shaped nanoparticles, nanorods and nanowires.

According to some embodiments of the invention, a fuel system as described herein comprises: an anode compartment comprising the compound having the formula $R_1R_2N—NR_3R_4$, a salt, a hydrate or a solvate thereof, as fuel, and a catalyst layer that comprises copper nanoparticles; a cathode compartment comprising an oxidant; and a separator interposed between the cathode and the anode compartments.

According to some embodiments of the invention, the cathode comprises a catalyst layer which comprises a non-noble metal and/or a non-metallic substance.

According to some embodiments of the invention, the cathode comprises a catalyst layer which comprises the non-metallic substance.

According to some embodiments of the invention, the non-metallic substance is a metal complex.

According to some embodiments of the invention, the metal complex is selected from the group consisting of ferrocene and Prussian Blue.

According to some embodiments of the invention, a fuel cell system as described herein comprises: an anode compartment comprising the compound having the formula $R_1R_2N$—$NR_3R_4$, a salt, a hydrate or a solvate thereof, as fuel, and a catalyst layer that comprises copper; a cathode compartment comprising a peroxide as an oxidant, and a catalyst layer that comprises a metal complex; and a separator interposed between the cathode and the anode compartments.

According to some embodiments of the invention, a fuel cell system as described herein comprises: an anode compartment comprising the compound having the formula $R_1R_2N$—$NR_3R_4$, a salt, a hydrate or a solvate thereof, as fuel, and a catalyst layer that comprises copper nanoparticles; a cathode compartment comprising a peroxide as an oxidant, and a catalyst layer that comprises a metal complex; and a separator interposed between the cathode and the anode compartments.

According to some embodiments of the invention, each of $R_1$-$R_4$ is hydrogen.

According to some embodiments of the invention, the anode compartment further comprises an alkaline aqueous solution.

According to some embodiments of the invention, the alkaline aqueous solution comprises a metal alkali hydroxide.

According to some embodiments of the invention, the metal alkali hydroxide is selected from the group consisting of sodium hydroxide, potassium hydroxide, lithium hydroxide, magnesium hydroxide, calcium hydroxide, strontium hydroxide and barium hydroxide.

According to some embodiments of the invention, the metal alkali hydroxide is sodium hydroxide.

According to some embodiments of the invention, the cathode compartment further comprises an acidic aqueous solution.

According to some embodiments of the invention, the cathode compartment comprises a peroxide oxidant and wherein a concentration of the peroxide oxidant ranges from 0.5% w/w to 25% w/w.

According to some embodiments of the invention, a fuel cell as described herein is exhibiting an open circuit potential ($E_{OCP}$) higher than 1.5 volts.

According to some embodiments of the invention, a fuel cell as described herein is exhibiting a power output (W) that equals to or in greater than 0.1 Watt.

According to an aspect of some embodiments of the invention there is provided a method of operating a fuel cell, the method comprising contacting an anode compartment of the fuel cell with an anode electrolyte solution that comprises a compound having the formula $R_1R_2N$—$NR_3R_4$, a salt, a hydrate or a solvate thereof, as described herein, and, at the same time, contacting a cathode compartment of the fuel cell with a cathode electrolyte solution which comprises an oxidant, and electrochemically reacting the compound having the general formula a compound having the formula $R_1R_2N$—$NR_3R_4$, a salt, a hydrate or a solvate thereof and the oxidant, wherein the anode compartment comprises an anode having a catalyst layer which comprises copper or a copper alloy, the fuel cell further comprising a separator interposed between the anode compartment and the cathode compartment.

According to an aspect of some embodiments of the invention there is provided a method of producing an electrical energy, the method comprising electrochemically reacting a compound having the formula $R_1R_2N$—$NR_3R_4$, a salt, a hydrate or a solvate thereof, as described herein, and an oxidant, wherein the compound having the formula $R_1R_2N$—$NR_3R_4$, a salt, a hydrate or a solvate thereof is contacted with an anode compartment which comprises an anode having a catalyst layer that comprises copper or an alloy thereof, and the oxidant is contacted with a cathode compartment, the anode compartment and the cathode compartment are assembled as a fuel cell which further comprises a separator interposed between the anode compartment and the cathode compartment.

According to some embodiments of the invention, the anode compartment comprises an anode having a catalyst layer which comprises copper nanoparticles.

According to some embodiments of the invention, the oxidant is a peroxide.

According to some embodiments of the invention, the cathode compartment comprises a cathode having a catalyst layer that comprises a non-metallic substance.

According to an aspect of some embodiments of the invention there is provided a power plant comprising the fuel cell system as described herein.

According to an aspect of some embodiments of the invention there is provided a vehicle, fueled by the fuel cell system as described herein.

According to an aspect of some embodiments of the invention there is provided a method of powering an electricity-consuming device, the method comprising powering the electricity-consuming device with the fuel cell system as described herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods and examples are illustrative only and are not intended to be necessarily limiting.

BRIEF DESCRIPTION OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
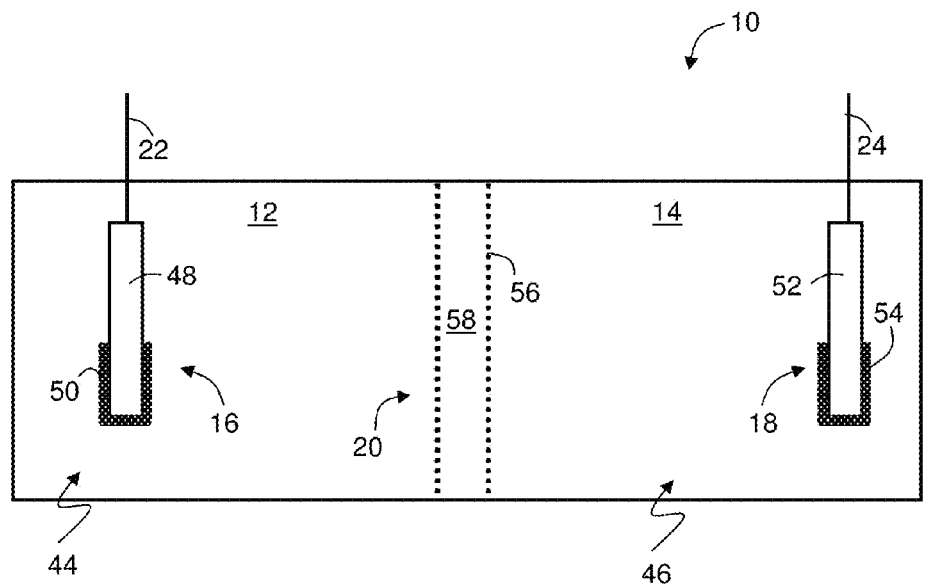
FIGS. 1A and 1B are schematic illustrations of a fuel cell, according to various exemplary embodiments of the present invention.

The present invention, in some embodiments thereof, relates to energy conversion and, more particularly, but not exclusively, to a direct liquid fuel cell system, which utilizes hydrazine or derivatives thereof as fuel, and to applications employing the fuel cell system.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As discussed hereinabove, hydrazine is widely used in fuel cell devices or systems intended for use in, for example, vehicles and spacecrafts. Most of the currently available hydrazine-based fuel cells include electrodes made of precious metals such as platinum or platinum-group metals (PGM).

In a search for hydrazine-based fuel cell systems with improved characteristics, the present inventors have devised and tested a copper-containing electrode for the electro-oxidation of hydrazine.

While reducing the present invention to practice, the present inventors have surprisingly uncovered that: (i) a copper containing electrode which has a rough surface is characterized by a low overpotential for hydrazine oxidation ($E_{OP}$<300 mV) and high discharge current (up to 2 A); (ii) copper containing electrode which has a rough surface is shows high discharge characteristics, exhibiting $E_{OCP}$ lower than –1 V; and an operation potential ($E_W$) of about –0.75 V at discharge current of 100-150 mA·cm$^{-2}$ at RT, rendering it highly efficient as compared to Pt or PGM catalysts; and (iii) notably, a copper nanoparticles-containing electrode exhibits highly improved parameters in electro-oxidation of hydrazine.

As discussed in detail in the Examples section that follows, the present inventors have surprisingly uncovered that copper containing electrode which has a rough surface, such as, for example, a copper nanoparticles-containing electrode, exhibits a synergistic effect, manifested by an increased current density, which results from the high surface area of the nanostructured electrode and an increased level of $Cu_{II}$ species on the electrode, which act as electron transfer mediator catalysts (See, Example 2).

Without being bound to any particular theory, the present inventors have assumed that during a copper-catalyzed electrochemical reaction between hydrazine and an oxidant, Cu(II) ions are formed. These Cu ions can be reduced in the presence of hydrazine back to Cu$^0$ particles, thus generating an equilibrium between Cu(0) and Cu(II). The present inventors have further suggested that the improved effect exhibited by a copper electrode with a high roughness factor, as obtained, for example, in a copper mesh electrode having a high surface area or with a copper nanoparticles-containing electrode, and which therefore has a high surface area, results from modulating the equilibrium between Cu(0) and Cu(II) on the electrode surface.

The present inventors have therefore suggested that a copper-containing electrode used in a hydrazine-based fuel cell acts as a Cu$^0$/Cu(II) system.

The present inventors have further demonstrated that copper-containing electrodes can be efficiently utilized for constructing a fuel cell system, which utilize hydrazine as fuel and hydrogen peroxide as an oxidant. The practiced fuel cell system was devoid of precious metal catalysts.

Accordingly, it has been uncovered that:

Fuel cells which utilize hydrazine as fuel and hydrogen peroxide as an oxidant are highly efficient;

Fuel cells which utilize hydrazine as fuel act efficiently when a non-precious catalyst is used in the anode and/or cathode compartment thereof;

Fuel cells which utilize hydrazine as fuel exhibit a higher efficiency when a copper catalyst made of copper nanoparticles is used to electro-oxidize the fuel.

The overpotentials of the anode and cathode ($\Delta E_A$ and $\Delta E_c$) depend on the electrode kinetics, catalyst material, mass transport conditions, electrode structure, fuel concentration, fuel viscosity and background electrolyte properties (electrical conductivity).

As used herein and in the art, the phrase "open circuit potential", denoted as $E_{OCP}$, describes the potential measured between an anode and a cathode when there is no external load, namely, no current is applied to or formed in the cell.

As used herein and in the art, the phrase "working potential", also referred to as "operation potential" denoted as $E_W$, is the potential measured in an electrochemical cell (between anode and cathode) when current is applied to or formed in the cell.

As used herein and in the art, the term "overpotential", denoted as $E_{OP}$, is the potential at which a redox reaction occurs in the presence of one catalyst as compared to another catalyst. In other words, an overpotential reflects the effect of replacing a catalyst on the potential required for an electrochemical process to occur.

Hence, according to an aspect of some embodiments of the invention there are provided fuel cell systems. Each of the fuel cell systems provided herein comprises an anode compartment, a cathode compartment and a separator interposed between the cathode and the anode compartments, whereby the anode compartment comprises a compound represented by the formula: $R_1R_2N-NR_3R_4$, including a hydrate, a solvate or a salt thereof, as fuel, wherein each of $R_1$-$R_4$ is independently selected from the group consisting of hydrogen, alkyl, alkenyl, alkynyl, haloalkyl, cycloalkyl, heteroalicyclic, alkoxy, thioalkoxy, carboxy, ketone, amide, hydrazide and amine, provided that at least one of $R_1$-$R_4$ is hydrogen.

The term "alkyl" describes a saturated aliphatic hydrocarbon including straight chain and branched chain groups. In some embodiments, the alkyl group has 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. In some embodiments, the alkyl is a medium size alkyl having 1 to 10 carbon atoms. In some embodiments, the alkyl is a lower alkyl having 1 to 4 carbon atoms.

The term "alkenyl" describes an alkyl, as defined herein, which has at least 2 carbon atoms and at least one unsaturated double bond.

The term "alkynyl" describes an alkyl, as defined herein, which has at least 2 carbon atoms and at least one unsaturated triple bond.

The term "cycloalkyl" describes an all-carbon monocyclic or fused ring (i.e., rings which share an adjacent pair of carbon atoms) group where one or more of the rings does not have a completely conjugated pi-electron system.

The term "haloalkyl" describes an alkyl group as defined above, further substituted by one or more halide.

The term "alkoxy" describes both an —O-alkyl and an —O-cycloalkyl group, as defined herein.

The term "thiohydroxy" describes a —SH group.

The term "thioalkoxy" describes both a —S-alkyl group, and a —S-cycloalkyl group, as defined herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino and the like.

The term "carboxy" describes a —C(=O)—OR' group, wherein R' is as described herein, or, alternatively, can be a hydrazine group or a derivative thereof, as described herein. When R' is hydrazine, a carboxy derivative of hydrazine is referred to herein as hydrazine carbonate.

The term "ketone" describes a —C(=O)—R' group, wherein R' is as described herein, or alternatively, R' is a polymeric backbone of which the —C(=O)-hydrazine is a pendant group.

The term "amide" describes a —C(=O)—NR'R", wherein R' and R" are as described herein.

The term "hydrazide" describes a —C(=O)—$NR_1NR_3R_4$, wherein $R_1$, $R_3$ and $R_4$ are as described herein.

As used herein, the term "amine" describes a —NR'R" group, wherein R' and R" are each independently hydrogen, alkyl or cycloalkyl, as these terms are defined herein.

It is noted that the fuel described herein produces electrons upon an electro-oxidation that is enabled by the presence of one or more hydride anions. Accordingly, the fuel cell efficiency depends, at least in part, on the number of electrons produced in the electro-oxidation process, which in turn, depends on the number of potential hydrides in the fuel. By "potential hydrides" it is meant to describe hydrogen atoms that have at least a partial negative charge and hence can function as electron donating groups.

Accordingly, in some embodiments, at least two of $R_1$-$R_4$ are hydrogen.

In some embodiments, each of $R_1$-$R_4$ is hydrogen.

Accordingly, in some embodiments the fuel is $H_2N-NH_2$ (hydrazine, or Hz).

In some embodiments, the fuel cell is a hydrazine derivative, in which one, two or three of $R_1$-$R_4$ is other then hydrogen. Non-limiting examples include hydrazine acetate ($NH_2-NH-COOH$), monomethyl hydrazine ($NH_2-NH(CH_3)$, symmetric and asymmetric dimethylhydrazine ($NH(CH_3)-NH(CH_3)$ and $NH_2N(CH_3)_2$, respectively), methyl carbazate ($N_2H_3COOCH_3$), carbodihydrazide ($N_2H_3CON_2H_3$), hydrazine carbonate (($N_2H_4)_2CO_2$), and aminopolyacrylamide (APA, —$[CH_2CH(CONHNH_2)]_{0.8}$—$[CH_2CH(CONH_2)]_{0.2}$).

In some embodiments, the fuel cell is a hydrazine salt. Non-limiting examples include hydrazine sulfate ($N_2H_4.H_2SO_4$), and hydrazine mono halogenid ($N_2H_4.HX$, wherein, X is halogen such as chloro, bromo or iodo).

In some embodiments, the fuel cell is a hydrazine hydrate or solvate.

The term "solvate" refers to a complex of variable stoichiometry (e.g., di-, tri-, tetra-, penta-, hexa-, and so on), which is formed by a solute (hydrazine or a derivative thereof) and a solvent, whereby the solvent does not interfere with the electrochemical activity of the solute.

The term "hydrate" refers to a solvate, as defined hereinabove, where the solvent is water.

For the sake of simplicity, whenever hydrazine is referred to herein throughout, it is to be understood that any of the above-described derivatives, salts, hydrates and solvates, is also contemplated.

Accordingly, the fuel cell systems described herein are also referred to as hydrazine-based fuel cells, and encompass hydrazine and/or its derivatives, salts, hydrates and solvates, as described herein, as fuel.

In some embodiments, the fuel cell system described herein comprises a precursor of hydrazine, that is, a compound which can be readily converted to hydrazine (e.g., by hydrolysis), and thus generate hydrazine, in situ. Such a precursor overcomes the limitations associated with hydrazine-based fuel cells, since when the fuel cell is not operated, the hydrazine is kept in a more stable and less toxic form, and thus, for example, storage and transportation are facilitated. In some embodiments, such a precursor is in solid form. In some embodiments, the precursor generates hydrazine by hydrolysis and/or thermal treatment (e.g., heating). An exemplary precursor is hydrazone.

In some embodiments, the precursor is kept in a reactor which is operatively connected to the fuel cell system. The reactor serves for storing the precursor and/or for generating the hydrazine, which, once generated, is introduced into the fuel cell.

Figure 1B:
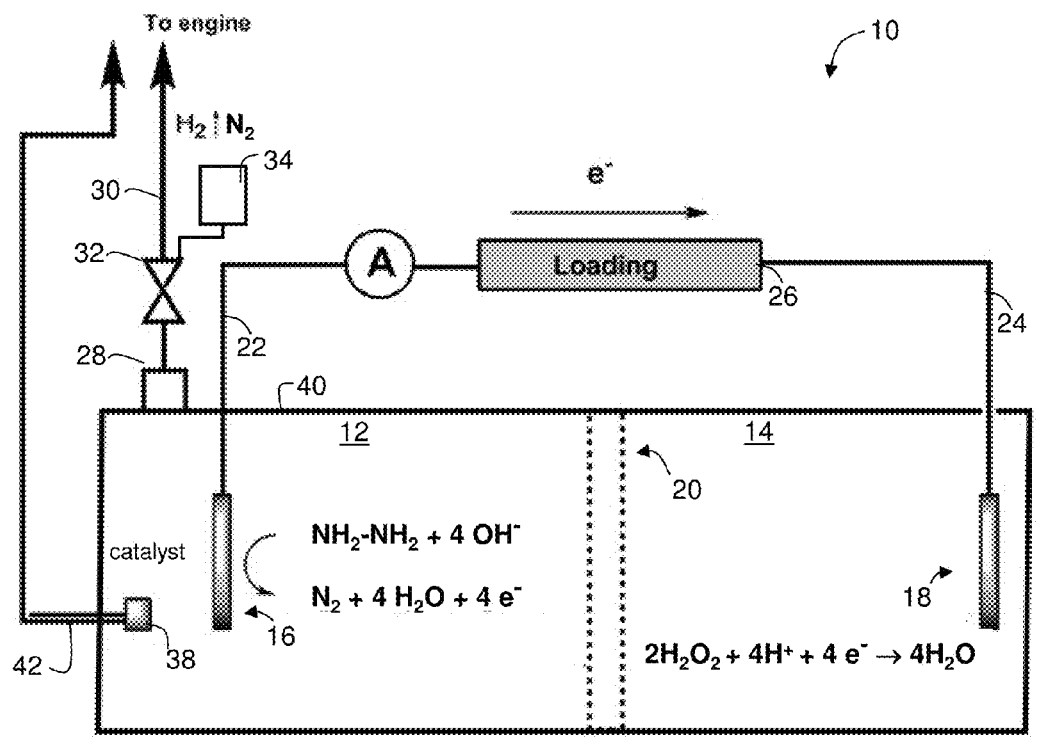
Figure 2:
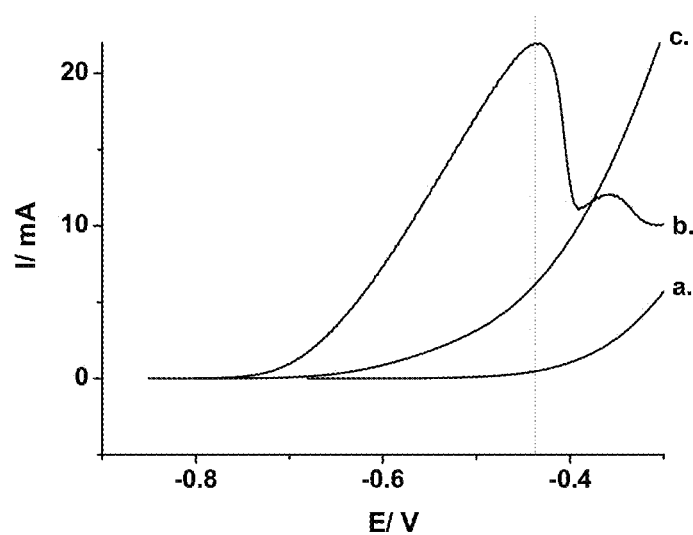
FIG. 2 presents comparative plots showing the electro-oxidation process of hydrazine in the presence of an Au catalyst (a), a Cu catalyst (b) and an Ag catalyst (c) (A=0.5 $cm^2$ for all catalysts), in experiments preformed in 0.4 M hydrazine in 1 M NaOH, by applying a sweep potential, at scan rate 50 $mV·s^{-1}$, using Ag/AgCl, KCl saturated, as reference electrode.

Referring now to the drawings, FIGS. 1A and 1B illustrate a fuel cell 10 according to some embodiments of the invention. In the representative example illustrated in FIGS. 1A and 1B fuel cell 10 is made-up of an anode compartment 12 and cathode compartment 14.

Referring to FIG. 1A, cell 10 generally comprises anode compartment 12, cathode compartment 14 and separator 20.

Anode compartment 12 comprises an anode 16 and a liquid fuel composition 44 at least partially filling compartment 12. Anode 16 or part thereof (e.g., the lower part) is kept in contact with liquid fuel composition 44 at all times. Anode 16 comprises an electrode 48 and a catalyst layer 50, which is typically deposited on the surface of electrode 48, preferably at the part which is in contact with fuel composition 44.

Since the electric energy is generated in anode compartment 12, it is desired to have an anode with a catalyst layer that has a high surface area.

Herein throughout, an electrode (anode or cathode) that comprises a catalyst layer is also referred to as a catalyst-containing electrode. Thus, in various exemplary embodiments of the invention anode 16 is a catalyst-containing electrode.

The fuel composition of some embodiments of the invention comprises hydrazine and/or a derivative, a salt, a hydrate or a solvate thereof, as described herein, dissolved or suspended in an aqueous solution (e.g., an anode electrolyte). In these embodiments, the aqueous solution preferably comprises an alkaline substance such as, for example, a metal alkali hydroxide, as discussed in detail hereinunder.

Cathode compartment 14 comprises a cathode 18 and an oxidant composition 46 at least partially filling compartment 14. Cathode 18 or part thereof (e.g., the lower part) is kept in contact with oxidant composition 46 at all times. Cathode 18 comprises an electrode 52 and a catalyst layer 54. Catalyst layer 54 is typically deposited on the surface of electrode 52, preferably on the part which is in contact with oxidant composition 46.

The oxidant composition of the present embodiments comprises an oxidant and is optionally dissolved or suspended in a solution (e.g., a cathode electrolyte). The oxidant composition can be in a liquid phase or is a gas phase. When in a gas phase (e.g., $O_2$ in air), the cathode compartment further comprises a means for introducing the oxidant, such as, for example, a fan or an air pump (not shown). Alternatively, the cathode compartment can be filled, at least partially, with a solution containing the oxidant. It is noted that when the oxidant is, for example, oxygen, it can be dissolved in an aqueous composition.

In some embodiments of the present invention separator 20 comprises a solid separator 56 and an electrolyte membrane 58. The separator can be ionically conductive or non-conductive, as desired. When ionically conductive, the separator can be conductive for cations, anions or both. In various exemplary embodiments of the invention the separator is electrically non-conductive. In various exemplary embodiments of the invention the separator is anion-conductive or hydroxy-conductive.

The nature and characteristics of the anode, cathode, catalyst layers, oxidants, solutions and separators, as well as of other components that can be added to the anode and/or cathode compartments, or to the system as a whole, are further detailed hereinbelow.

The distances between the anode, cathode, separator, fuel cell walls, and other components can be manipulated and are generally as would be recognized by a person skilled in the art.

An exemplary embodiment of fuel cell 10 is illustrated in FIG. 1B. It is to be understood that although the description below is with reference to FIG. 1B, any of the described embodiments can be independently incorporated in the fuel cell as described above and illustrated in FIG. 1A.

In some embodiments of the invention, anode compartment 12 comprises anode 16, a catalyst, a fuel composition and an alkaline aqueous solution. In various exemplary embodiments of the invention the catalyst is a copper catalyst. In the representative example illustrated in FIG. 1B, the fuel is hydrazine.

Cathode compartment 14 comprises cathode 18, and an oxidant. In the representative example illustrated in FIG. 1B, the oxidant is hydrogen peroxide. In some embodiments, cathode compartment 14 further comprises an acidic aqueous solution Fuel cell 10 can further comprise a separator 20, interposed between anode compartment 12 and cathode compartment 14.

In various exemplary embodiments of the invention fuel cell 10 further comprises electrical leads 22 and 24 for connecting electrodes 16 and 18 to an electric load 26 so as to supply electrical energy thereto. Upon such connection, electrons begin to flow from electrode 16 via load 26 to electrode 18, as indicated by an arrow in FIG. 1B. The electrical current flowing in the closed electrical circuit can be measured and optionally monitored using a current measuring device 36 connected in serial to load 26. Other parameters, such as voltage, can also be measured, if desired, as known in the art.

During the electrochemical reaction within compartment 12, hydrogen gas and nitrogen gas may be produced as side products, as a result of a chemical side reaction that involves decomposition of the fuel and results in hydrogen and nitrogen generation. In some embodiments of the invention fuel cell 10 further comprises a gas outlet 28 located on a wall 40 of cell 10 at the side of anode compartment 12, for allowing evacuation of the hydrogen gas and/or nitrogen gas out of anode compartment 12. A particular advantage of the present embodiment is that the hydrogen gas can be used as a fuel component, for example, in a hydrogen-driven engine (not shown) or the like. Thus, in some embodiments of the present invention the hydrogen gas is conveyed, e.g., by means of a gas convey tube 30, to the engine or any other external location. Optionally and preferably the flow of hydrogen gas through outlet 28 is controlled by a valve 32. Valve 32 can be operated manually or automatically by a controller 34.

Optionally and preferably, the electrochemical reaction within compartment 12 is monitored, for example, by means of an electrochemical unit 38 located in compartment 12. Electrochemical unit 38 comprises a catalyst layer suitable for the electrochemical process occurring in the fuel cell. The catalyst can be identical or different from the catalyst layer of anode 16. Unit 38 can be configured to measure any parameter pertaining to the operation and/or state of cell 10. These include, without limitation, $E_{OCP}$, which is indicative of the fuel concentration and/or viscosity, and the like. Electrical signals generated by unit 38 can be transmitted, e.g., via communication line 42 to a remote location (not shown).

In some embodiments, a fuel cell system, as described herein, further comprises a chamber for supplying the fuel to the anode compartment, which is operatively connected to the anode compartment and is configured to provide the fuel composition to the anode. In some embodiments, the fuel cell system further comprises a chamber for supplying the oxidant to the cathode compartment, which is operatively connected to the cathode compartment and is configured to provide the oxidant composition to the cathode.

In some embodiments, a fuel cell system as described herein, is configured as a battery system. A battery system does not comprise chambers for supplying fuel and/or oxidant.

In some embodiments, the fuel cell system described herein is a liquid direct fuel cell.

In some embodiments, the fuel cell system described herein operates at room temperature, although higher temperatures are also contemplated.

As delineated hereinabove, the cathode compartment comprises an oxidant. The present inventors have demonstrated that a fuel cell that utilizes hydrazine as fuel and a peroxide such as hydrogen peroxide as an oxidant, operates in high efficiency.

Hence, according to an aspect of some embodiments of the invention there is provided a fuel cell system which comprises an anode compartment which comprises hydrazine or a derivative, salt, hydrate or solvate thereof, as described herein, as fuel, a cathode compartment that comprises a peroxide as an oxidant and a separator interposed between the cathode and anode compartments.

In some embodiments, the peroxide used as an oxidant in the cathode compartment is hydrogen peroxide. As discussed hereinabove, hydrogen peroxide is a highly potent oxidant.

However, other peroxides are contemplated, including, as non-limiting examples, benzoyl peroxide, dicumyl peroxide, lauroyl peroxide and the like.

The cathode compartment can further comprise an electrolytic aqueous solution in which the peroxide is dissolved. Such a composition is also referred to herein as oxidant composition. In some embodiments, the oxidant composition comprises an acid, as is further detailed hereinunder.

The fuel cell according to these embodiments of the invention is based on anodic oxidation of the fuel (e.g., hydrazine) and cathodic oxidation of the peroxide (e.g., hydrogen peroxide), as exemplified in the following equations:

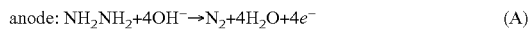anode: $NH_2NH_2 + 4OH^- \rightarrow N_2 + 4H_2O + 4e^-$  (A)

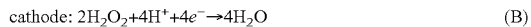cathode: $2H_2O_2 + 4H^+ + 4e^- \rightarrow 4H_2O$  (B)

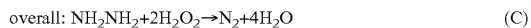overall: $NH_2NH_2 + 2H_2O_2 \rightarrow N_2 + 4H_2O$  (C)

As demonstrated in the Examples section that follows, the present inventors have surprisingly uncovered that hydrazine-based fuel cells exhibit an improved performance when catalysts other than platinum (Pt) or platinum group metals (PGM) are utilized.

Accordingly, according to an aspect of some embodiments of the invention there is provided a fuel cell comprising an anode compartment, which comprises hydrazine or a derivative, salt, solvate or hydrate thereof as fuel, as described herein, a cathode compartment, which comprises an oxidant, and a separator interposed between the cathode and the anode compartments, as described herein, wherein at least one of the anode and the cathode comprises a catalyst layer that is devoid of platinum (Pt) or a platinum group metal (PGM).

As used herein and in the art, the phrase "platinum group metals", abbreviated PGM, collectively refers to six metallic elements clustered together in the periodic table, which include ruthenium, rhodium, palladium, osmium, iridium, and platinum.

In some embodiments, both the anode and the cathode comprise a catalyst layer that is devoid of platinum or a platinum group metal.

As used herein throughout, the phrase "devoid of" encompasses the presence of minute amounts of the indicated substance (for example, less than 0.1% by weight, less than 0.01% by weight, and less than 0.001% by weight), as well as the complete absence of the indicated substance.

The disadvantages associated with fuel cells based on hydride-containing fuels which utilize Pt or PGM as catalysts, as well as the disadvantages associated with utilizing Pt or PGM as catalysts in any fuel cell system, are set forth hereinabove. Hence, a fuel cell in which at least one of the anode and cathode is devoid of such catalysts circumvents at least some of the limitations associated with these catalysts.

A non-limiting example of the advantages of utilizing catalysts devoid of Pt or PGM is the ability to use a fuel composition that comprises an alkaline solution in which the concentration of the alkaline substance can be lower even by a factor of 10 (an order of magnitude) than that required with Pt or PGM catalysts.

In addition, Pt and PGM are beneficially avoided due to cost considerations. Platinum, for example, is considered a precious metal, as defined hereinafter. Pt and PGM are further disadvantageous since they catalyze extensively the chemical decomposition of hydrazine, and further, can be subjected to poisoning by various environmental species.

Utilizing at least one of an anode and a cathode that is devoid of Pt or PMG is therefore beneficial.

Pt and PMG catalysts, however, are known to exhibit a very good overpotential in fuel cell reactions.

Hence, the present inventors were surprised to uncover, in a search for alternative catalysts, that while utilizing hydrazine as fuel, and an Au group metal, namely, gold (Au), silver (Ag) or copper (Cu), as a catalyst, the cell performs at least similarly to Pt- and PMG-containing electrodes. The present inventors have further surprisingly uncovered that the most efficient performance of the fuel cell was achieved while utilizing a catalyst layer that comprises copper.

Accordingly, according to another aspect of embodiments of the invention there is provided a fuel cell system that comprises an anode compartment, which comprises hydrazine or a derivative, salt, hydrate or solvate thereof, as described herein, as fuel, a cathode compartment, which comprises an oxidant or an oxidant composition, as described herein, and a separator interposed between the cathode and the anode compartments, wherein the anode comprises a catalyst layer that comprises copper or an alloy thereof, as detailed herein.

In some embodiments, the copper utilized as the catalyst layer has a purity greater than 99%, greater that 99.9% and even greater than 99.99%.

In some embodiments, an alloy of copper is utilized. The alloy can include, for example, from 0.01% to 5% or from 0.01% to 2%, or from 0.01% to 1%, by weight, a metal (or any other substance) other than copper.

Since copper is a non-precious metal, and is further considered as non-noble metal due to its relative tendency to oxidize, its use in constructing a fuel cell is cost effective and hence beneficial. In addition, as shown in the Examples section that follows, a hydrazine-based fuel cell system as described herein was found to exhibit an improved performance when an anode containing copper as the catalyst layer was used.

In some embodiments, the anode comprises a catalyst layer that consists of copper.

The catalyst layer can be in a form of, for example, a plate, a rod, a mesh, granules or particles. Other forms are also contemplated.

When being in a form of a mesh, in some embodiments, the mesh is characterized by a grid that ranges from 0.1 mm to 1 mm. The mesh can further be composed of wires that have a diameter in the range of 50-100 pμm. The number and density of the wires in the grid can be manipulated, so as to obtain desired parameters (e.g., surface area).

The mesh, according to some embodiments of the invention, is characterized by high surface area (as compared, for example, to a plate or a rod), and can be regarded as having a morphology similar to microparticles.

In some embodiments, the catalyst layer containing copper or an alloy thereof is in a form of particles.

In some embodiments, the catalyst layer containing copper or an alloy thereof has a microstructure or a nanostructure.

By "microstructure" it is meant that the catalyst layer comprises microparticles or has morphological properties that resemble microparticles, as in the case of a mesh structure, as described herein.

"Microparticles", as used herein, describe particles of any shape, which have a size less than 1,000 microns ($\mu$m).

"Nanoparticles", as used herein, describe particles of any shape, which have a size less than 1,000 nm.

By "nanostructure" it is meant that the catalyst layer comprises nanoparticles or has morphological properties that resemble microparticles, obtained, for example, by forming a mesh nanostructure.

In some embodiments, the catalyst layer containing copper or an alloy thereof is in a form of nanoparticles. In some embodiments, the nanoparticles have a size that ranges from 10 nm to 500 nm. The nanoparticles can be round-shaped (e.g., spherical) nanoparticles, or can be in shaped as nanorods, having a size of 10-100 nm, as an example, or as nanowires, having a size of 10-100 nm, as an example. When spherical nanoparticles are used, the nanoparticles are typically deposited on a support, preferably a conductive support such as a carbon support, titanium support or Ni-foam support, or on a Cu electrode. In some embodiments, spherical nanoparticles have a diameter of, for example, 10-100 nm. The nanoparticles can also include a mixture of round-shaped, nanorods and/or nanowires.

Using a catalyst layer in a form of nanoparticles provides for enhanced surface area of the catalyst layer, and further provides nano-roughness, which impart improved electrochemical properties to the cell, as exemplified in the Examples section that follows (see, for example, Example 2).

Figure 4:
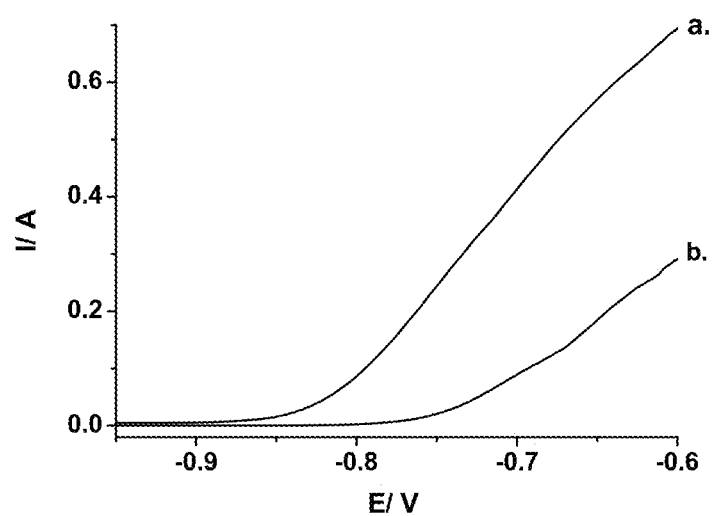
FIG. 4 presents comparative plots showing the electro-oxidation process of hydrazine (0.1 M hydrazine in 6 M NaOH) using a conventional Cu mesh electrode (curve a) and a Cu nanoparticles-containing electrode (curve b), each having a geometrical area of 2 $cm^2$. The electrochemical measurements were performed by applying a sweep potential, scan rate 20 mv·s$^{-1}$, using Ag/AgCl, KCl saturated, as reference electrode.

As further discussed in detail in the Examples section that follows (see, Example 2), the present inventors have surprisingly uncovered that using copper nanoparticles as a catalyst layer results in a synergistic effect of the electrochemical performance of the fuel cell (see, for example, FIG. 4).

Without being bound to any particular theory, it has been suggested that the improved performance obtained while using copper nanoparticles as a catalyst layer results from both, the high surface area thereof, and the presence of Cu(II) (also referred to as $Cu^{+2}$ ions) containing species, which act as electron transfer mediators, and affect hydrazine oxidation, similarly to their effect as reported in homogeneous catalyses (see, for example, Corey et al., supra).

Further without being bound to any particular theory, it has been suggested that while using copper nanoparticles as a catalyst layer, the $Cu^0 \leftrightarrow Cu(II)$ equilibrium is regulated by the simultaneous reduction of Cu(II) to $Cu^0$ by hydrazine and the Cu(II) catalyzed oxidation of hydrazine.

Accordingly, using a catalyst layer that comprises Cu nanoparticles (as in a Cu nanoparticles-containing electrode), it is suggested that a $Cu^0/Cu(II)$ system is obtained on the electrode surface.

Hence, according to an aspect of embodiments of the invention there is provided a fuel cell that comprises an anode compartment, which comprises hydrazine or a derivative, salt, hydrate or solvate thereof, as described herein, as fuel, a cathode compartment, which comprises an oxidant or an oxidant composition, as described herein, and a separator interposed between the cathode and the anode compartments, wherein the anode comprises a catalyst layer that comprises copper nanoparticles, or a copper-containing microstructure or nanostructure, as detailed herein.

In each of the embodiments described herein, the cathode in the fuel cell system can comprise any catalyst layer that is suitable for use in a hydrazine-based fuel cell, with the respective oxidant, so as to catalyze the electro-reduction of the oxidant.

Exemplary catalyst layers that are suitable for use in the context of these embodiments of the invention include, but are not limited to, a catalyst layer that comprises copper, silver, gold or an alloy of at least one or two of gold, silver and copper,; a catalyst layer that comprises platinum or PGM; a catalyst layer that comprises cobalt, nickel, iron, or other suitable metals; a catalyst layer that comprises oxides of suitable transition metals; a catalyst layer that comprises metal complexes of suitable transition metals; and a catalyst layer that comprises a non-metallic substance, as is further detailed hereinbelow.

In some embodiments, the cathode comprises a catalyst layer which is, or which comprises, a non-metallic substance.

As used herein, the phrase "a non-metallic substance" encompasses any compound that does not include an unbound metal, namely, a metal in its zero oxidation state, which is not coordinatively bound to a ligand. The phrase "non-metallic substance" therefore encompasses, for example, organic substances, inorganic substances and metallic complexes.

In some embodiments, the non-metallic substance can act as an electron-transfer mediator.

The phrase "electron-transfer mediator", which is also referred to herein interchangeably as "electron-transfer mediating substance" or "electron-transfer mediating agent" describes a substance that can participate in a redox reaction, via, for example, a reversible change in its electronic configuration. Thus, an electron-transfer mediator is typically a compound that can form a redox couple, or, in other words, a mixed valence compound.

Exemplary organic substances that can act as electron-transfer mediators and which are suitable for use in this context of embodiments of the invention include, but are not limited to, quinone or its derivatives, organic conducting salts, or viologen.

Representative examples include, but are not limited to, 7,7,8,8-tetracyanoquinodimethane, tetrathiafulvalene, N-methylacridinium, tetrathiatetracene, N-methylphenazinium, hydroquinone, 3-dimethylaminobenzoic acid, 3-methyl-2-benzothiazolinone hydrazone, 2-methoxy-4-allylphenol, 4-aminoantipyrin, dimethylaniline, 4-aminoantipyrene, 4-methoxynaphthol, 3,3',5,5'-tetramethylbenzidine, 2,2-azino-di-[3-ethylbenzthiazoline sulfonate], o-dianisidine, o-toluidine, 2,4-dichloro phenol, 4-aminophenazone, and benzidine.

As used herein, the phrase "metal complex", also referred to herein and in the art as "a coordination compound", describes a metal having attached thereto, via coordinative bonds, one or more ligands. Typically, the metal in the metal complex is ionized, and further typically, the metal is ionized such that its oxidation state is higher than in its natural form (non-ionized). The number of coordinative bonds depends on the size, charge, and electron configuration of the metal ion and the ligands. The metal in the metal complex can be any metal in the periodic table, including alkali metals, alkali earth metals, transition metals, actinides, lanthanides, etc. In some embodiments, the metal is a transition metal.

The phrase "metal complex", as used herein, encompasses inorganic complexes, in which the ligands in the complex are inorganic (e.g., —OH, —NO, —CO, —CN, etc.) and organic complexes (also referred to herein and in the art as organometallic complexes), in which at least one of the ligands in the complex is organic (e.g., cyclopentadienyl, ethylene, etc.).

The phrase "metal complex", as used herein, does not encompass metals that are not coordinatively bound to at least one ligand.

In some embodiments, the metal complex described herein is capable of acting as a charge-transfer mediator, e.g., an electron-transfer mediator, as described herein.

The phrase "electron-transfer mediator" in this context of the present embodiments therefore describes a metal complex, as described herein, in which the metal, a ligand or both can participate in a redox reaction.

Exemplary ligands that can participate in a redox reaction include ligands with two lone electron pairs, which can act as bridging ligands between two coordination centers, thus allowing electron transfer from one center to another.

Exemplary metals that can participate in redox reactions include metals that can adopt two or more oxidation states. Non-limiting examples include Iron ($Fe^{+2}/Fe^{+3}$), Chromium (Cr), Nickel (Ni) and Cobalt (Co).

In some embodiments, the metal complexes described herein can act as electron-transfer mediators by including a metal that can exist in two or more oxidation sates, as described herein. Non-limiting examples include iron complexes such as Prussian blue, ferrocene, potassium ferricyanide, potassium ferrocyanide, dimethylferrocene, ferricinium, ferocene-monocarboxylic acid, nickel complexes such as nickelocene. Other complexes of transition metals are also contemplated.

In some embodiments, the metal complexes described herein are iron complexes.

In some embodiments, the metal complex described herein is Prussian blue (an inorganic electron-transfer mediating metal complex).

In some embodiments, the metal complex described herein is ferrocene (an organic electron-transfer mediating metal complex).

In some embodiments, the non-metallic substance described herein is deposited on an organic conductive support, typically a carbon support such as, but not limited to, carbon cloth, carbon foil, carbon felt, carbon paper, and glassy carbon, as well as graphite rods, granules, or reticulated vitreous carbon (RVC), thus forming a non-metallic electrode. Other organic, inorganic or metallic conductive supports are also contemplated.

In some embodiments, the amount of the non-metallic catalyst layer in a non-metallic (e.g., carbon-based) electrode ranges from 0.01% to 1.5% by weight, of the total weight of the electrode.

As demonstrated in the Examples section that follows (see, Example 3), the present inventors have surprisingly uncovered that a hydrazine-based fuel cell that comprises a metal complex as the catalyst layer, deposited on a carbon support, in the cathode, exhibits an exceptional performance.

Electrodes comprising a non-metallic substance as a catalyst layer, and an organic support are highly cost-effective, particularly when compared to precious metal-containing electrodes, and further are characterized by simple preparation and storage.

Hence, according to an aspect of some embodiments of the invention, there is provided a fuel cell system which comprises an anode compartment comprising hydrazine or derivatives thereof as fuel, as described herein, a cathode compartment comprising a cathode which comprises a catalyst layer which is a non-metallic substance, and a separator, as described herein.

According to some embodiments of the invention, the non-metallic substance composing the catalyst layer in the cathode is a metal complex as described herein.

In some embodiments, the metal complex is ferrocene.

In some embodiments, the metal complex is Prussian Blue.

In some embodiments, whenever the cathode in the fuel cell system comprises a catalyst layer than comprises a metal complex or any other non-metallic substance, as described herein, the anode can comprise any catalyst layer that is suitable for use in hydrazine-based fuel cells.

Exemplary anode catalyst layers that are suitable for use in the context of these embodiments of the invention include, but are not limited to, copper, gold, silver, and an alloy of at least one or two of gold, silver and copper, as described herein; and Pt or PGM catalysts.

In some embodiments, the anode comprises a catalyst layer which comprises copper, gold, silver, and an alloy of at least one or two of gold, silver and copper.

In some embodiments, the anode comprises a catalyst layer which comprises copper, as described herein.

In some embodiments, the anode comprises a catalyst layer which comprises copper nanoparticles, or copper-containing microstructure or nanostructure, as described herein.

The present inventors have therefore devised and successfully prepared and practiced a fuel cell system in which at least one of the anode and cathode therein, or even both the anode and cathode therein, is a non-noble metal or a metal complex.

Accordingly, according to an aspect of some embodiments of the invention there is provided a fuel cell system comprising an anode compartment, which comprises hydrazine or derivatives thereof as fuel, a cathode compartment, and a separator interposed between the cathode and the anode compartments, whereby at least one of the anode and the cathode comprising a catalyst layer that comprises a non-noble metal and/or a non-metallic substance.

According to an aspect of some embodiments of the invention there is provided a fuel cell system comprising an anode compartment, which comprises hydrazine or derivatives thereof as fuel, a cathode compartment and a separator interposed between the cathode and the anode compartments, whereby at least one of the anode and the cathode comprises a catalyst layer that is devoid of a noble metal, as defined herein.

Accordingly, according to an aspect of some embodiments of the invention there is provided a fuel cell system comprising an anode compartment, which comprises hydrazine or derivatives thereof as fuel, a cathode compartment and a separator interposed between the cathode and the anode compartments, whereby at least one of the anode and the cathode comprises a catalyst layer that comprises a non-precious metal and/or a non-metallic substance, as defined herein.

According to an aspect of some embodiments of the invention there is provided a fuel cell system comprising an anode compartment, which comprises hydrazine or derivatives thereof as fuel, a cathode compartment and a separator interposed between the cathode and the anode compartments, whereby at least one of the anode and the cathode comprises a catalyst layer that is devoid of a precious metal, as defined herein.

As used herein and in the art, the phrase "noble metal" describes a metallic element with marked resistance to chemical reactions, particularly to chemical reactions that involve ionization such as oxidation and dissolution by e.g., inorganic acids. Non-limiting examples include platinum, gold and silver. The phrase "noble metal" encompasses precious metals.

The phrase "precious metal" describes a rare metallic element of high economic value, such as gold and platinum.

The phrase "non-noble metal" encompasses all metallic elements that are not defined as noble metals, and which are prone to chemical reactions such as oxidation and dissolution by e.g., inorganic acids. The phrase "non-noble metal" encompasses metallic elements other than, for example gold, silver and platinum.

The phrase "non-precious metal" describes metallic elements that are not of high economic value, and encompasses metallic elements other than, for example, gold and platinum.

In some embodiments, the non-metallic substance is a metal complex, including an organometallic complex and an inorganic complex, or an organic substance, as described herein.

In some embodiments, the anode comprises a catalyst layer that comprises a non-noble metal or a non-precious metal.

In some embodiments, the non-noble metal and/or the non-precious metal is copper.

Copper is known as a non-precious metal and is defined herein as a non-noble metal, since it is relatively susceptible to oxidation.

Thus, in some embodiments, the anode comprises a catalyst layer that comprises copper or an alloy thereof.

In some embodiments, when the anode comprises a non-noble and/or non-precious metal, the cathode comprises any of catalyst layers described herein. In some embodiments, both the anode and cathode comprise a catalyst layer that comprises a non-noble or non-precious metal and/or a non-metallic substance, as described herein.

In some embodiments, the cathode comprises a catalyst layer which is a non-metallic substance, as described herein. In these embodiments, the anode comprises any of the catalyst layers described herein.

In some embodiments, each of the anode and the cathode comprises a catalyst layer that comprises a non-noble metal, a non-precious metal and/or a non-metallic substance, as described herein.

In some embodiments, the anode comprises a catalyst layer that comprises copper and the cathode comprises a catalyst layer that comprises a non-metallic substance, as described herein.

In some embodiments, the non-metallic substance is a metal complex, as described herein.

In some embodiments, the non-metallic substance is an iron complex such as, for example, ferrocene or Prussian Blue.

Hence, according to an aspect of some embodiments of the invention there is provided a fuel cell system comprising an anode compartment, which comprises hydrazine or a derivative thereof, as described herein, and an anode that comprises a catalyst layer that comprises copper or an alloy thereof, as described herein, a cathode compartment, which comprises a cathode that comprises a catalyst layer that comprises a non-metallic substance, as described herein (e.g., a metal complex such as an iron complex), and a separator interposed between the anode and cathode compartments, as described herein.

In any of the fuel cell systems described herein, the cathode compartment further comprises an oxidant.

In some embodiments, the oxidant is a peroxide, as described herein.

Other oxidants that are suitable for use in combination with hydrazine fuel are also contemplated. An example of a suitable oxidant is oxygen. Oxygen can be provided as a gas, by supplying air into the fuel cell system, or by providing an aqueous solution is which oxygen is dissolved, as an oxidant composition.

In any of the fuel cells described herein, the electrodes composing the anode and cathode are made of a conductive material, such as carbon, graphite, ceramics, conductive polymers, conductive metals, etc. The conductive material can be utilized as a coating of a support material, or can compose the electrode. An electric-insulating layer which coats a part of the electrode that does not have the catalyst layer deposited thereon is optional. In some embodiments, a gas-impermeable layer is deposited on the catalyst layer or on the entire electrode.

Exemplary support materials onto which the catalyst layer is deposited, so as to form the anode or cathode, include carbon support materials, as described hereinabove, nickel meshes, nickel foams, and the like.

The electrodes can be commercially available electrodes or can be prepared or modified as desired.

In some embodiments, the anode and/or the cathode is a chemically modified electrode, namely, an electrode made of a suitable conductive material, as described herein, which is further modified by reacting it with, for example, amine-containing and/or sulfur containing compounds. Non-limiting examples include substituted or non-substituted aniline or pyridine.

Chemically modified electrodes can be obtained from a commercial vendor or can be prepared as desired.

In some embodiments, chemical modification of the electrode(s) is made in order to prevent undesired reactions.

For example, when hydrazine or a derivative thereof is used as fuel, a side reaction in which hydrazine is decomposed so as to produce nitrogen and hydrogen can occur in the anode compartment.

This reaction is undesired as it is a chemically destroying reaction, in which some of the fuel irreversibly reacts chemically, which leads to a decrease in the fuel concentration and hence to a decreased efficiency of the cell. This reaction is further undesired since the evolution of hydrogen and/or nitrogen as gas may reduce the cell efficiency.

Thus, is some embodiments, the anode is chemically modified by agents which are known to inhibit the above-described chemically destroying reaction.

In any of the fuel cell systems described herein, the anode compartment comprises an anode having a catalyst layer deposited thereon and an aqueous solution which serves as a fuel composition, as described herein.

The fuel cell composition in the anode compartment comprises the fuel, as described herein, and an aqueous solution that serves as an anode electrolyte solution.

In some embodiments, the aqueous solution is an alkaline aqueous solution.

In some embodiments, the alkaline aqueous solution comprises a metal alkali hydroxide.

As shown in equations A-C hereinabove, hydroxide ions participate in the electrochemical reaction.

The metal alkali hydroxide can be, for example, sodium hydroxide, potassium hydroxide, lithium hydroxide, magnesium hydroxide, calcium hydroxide, strontium hydroxide and/or barium hydroxide.

In some embodiments, the metal alkali hydroxide is sodium hydroxide.

In some embodiments, a concentration of the metal alkali hydroxide in the aqueous solution ranges from 0.1 M to 6 M.

As discussed hereinabove, while utilizing catalyst layers that are devoid of Pt or PGM, a lower concentration of hydroxide ions can be utilized, since there is no need to stabilize the Pt catalyst.

Hence, in some embodiments, a concentration of the metal alkali hydroxide ranges from 0.1 M to 3 M.

It is noted that while a lower concentration of the metal alkali hydroxide can be utilized, a too low concentration may affect the kinetics of the electrochemical reaction and shift the balance between the electrochemical reaction and the undesired chemically destroying reaction described hereinabove towards the undesired side reaction.

In some embodiments, the concentration of the alkali metal hydroxide is such that the pH of the fuel composition ranges from 6.8 to 14, or from 8 to 14.

If a pH of 8-11 is desired, metal alkali hydroxides such as lithium hydroxide, sodium hydroxide and potassium hydroxide, are typically used.

If a pH of 11-14 is desired, metal alkali hydroxides such as magnesium hydroxide, calcium hydroxide and barium hydroxide, are typically used.

In some embodiments, the fuel cell composition comprises, in addition to, or instead of, the alkali metal hydroxide, an alkali metal sulfate salt such as, for example, sodium sulfate, potassium sulfate, magnesium sulfate, calcium sulfate and barium sulfate.

In some embodiments, a concentration of the fuel in the aqueous solution described herein (anode electrolyte solution; fuel composition) ranges from 0.01 M to a saturated solution.

The concentration of the fuel is also determined by the desire to control the balance between the electrochemical reaction and the undesired chemically destroying reaction. At high fuel concentration, the extent of the chemically destroying reaction can be increased.

In some embodiments, the concentration of the fuel in the fuel composition ranges from 0.01 M to 10 M, or from 0.01 M to 1 M, or from 0.1 M to 1 M, or FROM 0.1 M to 0.5 M, or from 0.1 M to 10 M, or from 1 M to 10 M Alternatively, the concentration of the fuel in the fuel composition ranges from about 1% (w/v) to about 95% (w/v), or from about 1% (w/v) to about 40% (w/v), or from about 3% (w/v) to about 30% (w/v).

The fuel composition in the anode compartment can further comprise surface active agents, in order to prevent or decrease evolution of hydrogen and/or nitrogen gas. The concentration of these agents in the composition can range from 0.001% to 1%, or from 0.001% to 0.1%, or from 0.001% to 0.01% by weight. Exemplary suitable surface active agents include, but are not limited to, tetraalkylammonium compounds and/or aliphatic amines.

In some embodiments, the cathode compartment comprises an acidic aqueous solution, which, together with the peroxide oxidant, forms an oxidant composition.

The aqueous solution comprises an acid, preferably an inorganic acid, at a concentration that ranges from 0.5 M to 5 M. In some embodiments, the acid concentration is such that the pH of the aqueous solution ranges from 2 to 5, or from 2 to 4, or is being about 3.

In some embodiments, the oxidant composition comprises HCl, $H_2SO_4$ or a mixture thereof.

In an exemplary embodiment, the oxidant composition comprises HCl, at a concentration of 0.22 M and $H_2SO_4$ at a concentration of 3 M.

In some embodiments, when the oxidant is a peroxide, a concentration of the peroxide oxidant in the aqueous solution ranges from 0.5% w/v to 25% w/v, or from 0.5% w/v to 20% w/v, or from 0.5% w/v to 10% w/v, or from 0.5% w/v to 5% w/v.

In some embodiments, the oxidant composition further comprises surface active agents that may prevent evolution of oxygen gas (bubbles). A concentration of such agents can be in the ranges of from 0.001% to 1%, or from 0.01% to 1%, by weight.

In some embodiments, the electrolyte aqueous solution in the anode and/or cathode compartments (the fuel cell composition and/or the oxidant composition, respectively) can further comprise an organic solvent. The addition of an organic solvent may be beneficial for preventing or reducing evolution of hydrogen and/or nitrogen (in anode) and/or oxygen (in cathode) as bubbles.

In some embodiments, the content of the organic solvent can be in the range of 1% to 30% by weight, of the total weight of the composition.

Exemplary organic solvents that are suitable for use in this context of the present embodiments include, but are not limited to, dimethylformamide (DMF), ethylene glycol (EG), dimethyl sulfoxide (DMSO) and acetonitrile (AN).

In any of the fuel cells described herein, a separator is interposed between the cathode and anode compartments.

The separator acts as a barrier between the anode and cathode compartment and is typically ion-permeable (ionically conductive) and electron-impermeable (electrically non-conductive). Thus, the separator is typically electron non-conducting and ion-conducting.

The separator can be, and is also referred to herein, as an electrolyte membrane.

In some embodiments, the separator is a solid separator, or a solid electrolyte membrane.

In some embodiments, the separator is an alkali anion exchange membrane, which allows the transfer of anions such as $OH^-$, but is impermeable to other anions and to cations such as protons.

Any available alkali anion exchange membrane can be used in the context of these embodiments of the invention, including, as non-limiting examples, carbon-based membranes and nickel-based membranes.

In some embodiments, the solid electrolyte membrane is a Nafion membrane, preferably a Nafion Bilayer membrane such as, for example, Nafion 112, Nafion 115, Nafion 117 and Nafion 119, and any membrane in Nafion series 900-2000.

In some embodiments, the solid electrolyte membrane is a polypropylene membrane (e.g., a polypropylene micro-pore membrane having a pore diameter smaller than 0.1 μm).

In some embodiments, the solid electrolyte membrane is a polypropylene membrane wetted with a Nafion solution (e.g, from 0.05% to 0.5% by weight Nafion in ethanol).

As demonstrated in the Examples section that follows, the hydrazine-based fuel cell systems described herein exhibit high efficiency.

In some embodiments, a fuel cell system as described herein exhibits an open circuit potential ($E_{OCP}$) higher than 1 Volt, higher than 1.5 Volts and even higher than 1.7 Volts.

In some embodiments, a fuel cell system as described herein exhibits a power output (W) that equals to or is greater than 0.1 Watt. In some embodiments, the power output is higher than 100 $mW/cm^2$, higher than 150 $mW/cm^2$, higher than 200 $mW/cm^2$, and even higher than 500 $mW/cm^2$ (e.g., 600 $mW/cm^2$). Higher power output values are also contemplated.

In some embodiments, a fuel cell as described herein exhibits a high discharge potential. For example, the fuel cell exhibits a discharge potential that is higher than 1 Volt, higher than 1.2 Volt, higher than 1.5 Volt and even higher than 1.7 Volt (e.g., 1.75 Volt), at a current density of 100 mA/cm$^2$. Higher discharge potential values are also contemplated.

In some embodiments, a fuel cell as described herein produces high current. For example, the fuel cell exhibits a current density that is higher than 100 mA/cm$^2$, higher than 200 mA/cm$^2$, higher than 500 mA/cm$^2$ and is even 1.5 A/cm$^2$ and higher. Higher current density values are also contemplated.

As discussed hereinabove, any of the fuel cell systems described herein utilizes hydrazine or a derivative, salt, hydrate or solvate thereof so as to generate electrical power (energy).

Accordingly, according to another aspect of embodiments of the invention there is provided a method of generating electricity, which is effected by electrochemically reacting hydrazine or a derivative, salt, hydrate or solvate thereof and an oxidant (e.g., a peroxide), as described herein. In some embodiments, the electrochemical reaction is performed in a fuel cell system as described herein.

In some embodiments, the method is effected by supplying a fuel composition, as described herein, to the anode compartment of the system, and by supplying an oxidant composition, as described herein to the cathode compartment, and by continuing supplying these components as long as electricity is required, or as desired, such that that system operates as a fuel cell.

Supplying the fuel and oxidant compositions to the respective compartments of the fuel cells can be effected by any means known in the art (e.g., via a pump, a pipe, etc.).

In some embodiments, the method is effected by utilizing the system as a battery, such that the fuel is supplied only before use.

According to another aspect of embodiments of the invention there is provided a method of operating a fuel cell, which is effected by contacting an anode compartment of the fuel cell with an anode electrolyte solution that comprises hydrazine or a derivative, salt, hydrate or solvate thereof, as described herein, as a fuel, and, at the same time, contacting a cathode compartment of the fuel cell with a cathode electrolyte solution which comprises an oxidant, as described herein, and electrochemically reacting the fuel and the oxidant. In some embodiments, the fuel cell is any of the fuel cell systems as described herein.

Contacting can be effected by placing each of the anode or cathode in the respective composition or by supplying a fuel composition and an oxidant composition, as described herein, to the respective compartment in the fuel cell, as described hereinabove.

As is further discussed herein, the present inventors have designed and successfully prepared and practiced an electrode that comprises copper nanoparticles, as described herein, as a catalyst layer.

Accordingly, according to a further aspect of embodiments of the invention there is provided a fuel cell system comprising an anode compartment, a cathode compartment and a separator interposed between the cathode and the anode compartments, as described herein, wherein at least one of the anode and the cathode comprises a catalyst layer which comprises copper nanoparticles.

Further according to embodiments of the invention there is provided a process of producing an electrode having a catalyst layer that comprises copper nanoparticles. The process is effected by contacting an electrode having a catalyst layer that comprises copper with a solution containing a copper salt and base, to thereby obtain a layer of the copper salt applied onto the electrode; and contacting the electrode having the layer of copper salt applied thereon with phosphinic acid or a salt thereof, thereby producing the electrode.

The present inventors have utilized a known process of producing copper nanoparticles, for generating copper nanoparticles onto a copper electrode.

A copper-containing electrode onto which copper nanoparticles are generated can be any commercially available or laboratory-prepared electrode, and can be in a form of, for example, a plate, a rod or a mesh.

In some embodiments, the electrode is a mesh electrode, as described herein.

The solution used for forming a copper salt on the electrode is preferably an aqueous solution. Exemplary copper salts include, but are not limited to, copper sulfate, copper chloride and copper acetate.

In some embodiments, the aqueous solution comprises ammonia as base. However, other based are also contemplated. KOH is one, non-limiting, example.

In some embodiments, contacting the electrode with the copper salt solution is effected while heating the electrode soaked with the solution. Heating may be effected at 50-80° C.

In some embodiments, contacting the electrode having the copper salt deposited thereon with phosphinic acid is effected by heating. Heating may be effected at 50-80° C.

The phosphinic acid or a salt thereof is used for reducing the copper salt while generating copper nanoparticles. An exemplary salt is $NaH_2PO_2$. Other salts, as well as other compatible reducing agents are contemplated.

Further details concerning the process described herein are provided in Example 2 in the Examples section that follows.

The electrode containing a catalyst layer that comprises copper nanoparticles, as described herein, can be used in constructing a membrane-electrodes-assembly (MEA), for purposes other than fuel cells.

Any of the fuel cell systems described herein can be used in many applications. Generally, the fuel cell can be incorporated in any electrically driven or hybrid electric (namely, driven by electrical and at least one additional form of energy) system or device, or can be in electrical communication with the system or device for operating it. Systems and devices incorporating the fuel cell as described herein, or fueled by the fuel cell described herein, can be stationary or movable, portable or non-portable. In some embodiments, the fuel cell system is incorporated in a power source which is adapted to power the electrically driven system or device. The size, shape and output of the fuel cell is preferably adapted to the application which consumes its energy.

Herein, the phrase "electrically driven system or device" and "electricity consuming system or device" are used interchangeably.

One type of application which can incorporate the fuel cell or portable power source according to some embodiments of the present invention is an electronic device. Representative examples of such device, include, without limitation, a portable telephone, a personal computer, a notebook computer, a portable charging dock, a pager, a PDA, a digital camera, a gameplayer, a smoke detector, a hearing aid, a portable TV, night vision goggles, a portable GPS device, a portable lighting device, a toy, a computer peripheral device, an household appliance, a cordless household appliance, an industrial product, a mobile equipment, a robot, a cordless tool (e.g., drill, saw).

Another type of application which can incorporate the fuel cell or portable power source according to some embodiments of the present invention is an electrically driven or hybrid electric vehicle. One example of a vehicle suitable for the present embodiments is an automobile such as, but not limited to, a car, a bus, a forklift, a segway, a motorcycle, a mobility scooter, a two- three- or four-wheel scooter, a saddle-ride type vehicle. Another example is an unmanned utility vehicle, such as, but not limited to, an autonomous lawn mower, an autonomous pool cleaner and the like. An additional example is an elevated altitude manned or unmanned vehicle, such as, but not limited to, an aircraft, a high altitude aircraft, a rocket, a stratospheric aircraft and a spacecraft. A further example is a manned or unmanned underwater or above-water vehicle.

The fuel cell described herein can also be incorporated in distributed power source such as, but not limited to, a cogeneration system or a stationary power plant for a house, a public structure an industrial facility. Also contemplated are various appliances typical used in emergency situations, including, without limitation, emergency kits, emergency power supplies, emergency lights, backup generators and the like.

The fuel cell systems presented herein can be further used as a component in a power source in a location, such as, but not limited to, spacecraft, weather station, park, rural location and the like. A fuel cell system according to some embodiments of the present invention can be compact and lightweight.

The fuel cell systems presented herein can be further used in combined heat and power systems. The fuel cell systems of the present embodiments can be used to generate electric power, and at the same time produce hot air and water from the waste heat.

In some embodiments, the fuel cell systems described herein are utilized in a method for powering an electrically-driven or electricity-consuming system or device, as described herein. The powering is effected by establishing electrical communication (e.g., connecting) between the fuel cell system and the electricity-consuming system or device.

As used herein, the phrases "fuel cell", "fuel cell device" and "fuel cell system" are used interchangeably.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" or "process" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Materials and Experimental Methods

All chemical reagents were purchased from Sigma-Aldrich in analytical grade, unless otherwise indicated.

Ultrapure water (electrical resistance of 18 M $\Omega$) from EasyPure RF (Barnstead) source was used throughout all the experiments.

Cu mesh electrode (1.6 cm$^2$, unless otherwise indicated) 99.5%, 50-100 μm each wire was purchased from "Holand Morane".

Carbon cloth 90%, 1 mm thick, was purchased from Highborn, China.

Au, Ag and Cu foils (99.999%, 0.1 mm thick) were purchased from Holland-Morane.

Preparation of Cu Nanoparticles-Containing Electrodes:

Cu nanoparticles-containing electrodes were prepared according to the procedure described by Jian-guang et al. [Trans. Nonfer. Met. Soc. China, 2007, 12, s1181], as follows: a conventional Cu-mesh electrode (4 cm²) was soaked in a solution (3 ml) containing 0.2 M $CuSO_4$ and 0.8 M ammonia for 30 minutes, and thereafter heated to 65° C. 0.3 M $NaH_2PO_2$ (as a reducing agent, 3 ml) was then added to the Cu mesh electrode-containing mixture, and after additional 3 hours at 65° C., the obtained Cu electrode was washed with purified triple-distilled water and ethanol and was kept in acetonitrile until used.

Characterization of the Cu nanoparticles-containing electrodes was performed using HRSEM (Jeol, JSM-6700F).

Preparation of Ferrocene Carbon Cloth Cathode (C/Fc):

Ferrocene was obtained from Sigma and a saturated ferrocene ethanolic solution was prepared therefrom by dissolving 20 mg ferrocene in 10 ml ethanol.

Carbon cloth (20 cm²) was pre-treated so as to reduce oxygen species by performing 40 cyclic voltammograms in 1 M $H_2SO_4$+10% ethanol, applying a potential from −1.0 V to +1 V (−1 V was applied for 50 seconds and the +1.0 V was applied for 5 seconds before each cycle), scan rate; 50 mV/s.

The treated carbon cloth (20 cm²) was soaked in a saturated ferrocene ethanolic solution (10 ml) for 30 minutes. The obtained C/Fc was dried in an oven, for 1 hour at 40° C. The C/Fc electrode was soaked in ethanol before being used.

Preparation of Prussian Blue Carbon Cloth Cathode (C/Pb):

0.45 M of $FeCl_3$ solution and a 0.3 M of $K_4$-[Fe(CN)$_6$] solution were prepared, and 3 ml of each solution were mixed together to obtain the insoluble Prussian blue [www.chem-lab.truman.edu/Chemistryofartlabs/Synthesis%20of%20Prussian%20Blue.p df].

A carbon cloth electrode (10 cm²) was washed by ethanol (hydrophilized) and soaked in the Prussian blue solution for 3 hours. The electrode was thereafter washed with water until the water became almost lucid, and was then dried during 3 hours at 100° C. The obtained C/PB electrode was soaked in ethanol (hydrofofizided) before being used.

The Prussian Blue-soaked carbon cloth was used either per se or was rolled on graphite.

Electrochemical Measurements:

Electrochemical measurements were performed in a standard three-electrode cell comprised of the catalyst (metal electrode) as the working electrode, a carbon electrode (d=5 mm) as a counter electrode and Ag/AgCl (sat. KCl) as a reference electrode (Metrohm), for all experiments. The electrochemical experiments were conducted using PC-controller (Autolab GPES software, version 4.9) and Autolab potentiostat/galvanostat (PGSTAT302N).

Discharge Efficiency Measurements:

Anode discharge efficiency measurements were preformed in different galvanostatic regime. The efficiency of the process was calculated according to the following equation:

$$\eta = Q_d \cdot Q_t^{-1} \cdot 100\%$$

wherein η is the efficiency (reported in %), $Q_t$ is the theoretical calculated charge (Coulomb) (corresponding to the amount of Hz) and $Q_d$ is the real charge derived from the discharge curves (when a sharp increase of voltage was absorbed).

Full cell measurements were performed by a home-made PVDF electrochemical cell, Nafion 117 was used as a separating membrane, and the distance between the two electrodes was about 0.2 cm. The surface area of the anode and of the cathode is as indicated.

SEM measurements were conducted using a Jeol, JSM-6700F, electronic microscope.

Example 1

Electro-Oxidation of Hydrazine in the Presence of Gold, Silver and Copper Catalysts Since $E_{OCP}$ is an important parameter for determining the suitability of an electrode material in fuel cells, $E_{OCP}$ measurements were first performed.

The OCP measurements (vs. Ag/AgCl, sat KCl) were performed using Cu, Au and Ag plates (0.5 cm²) as catalysts in a solution containing 0.4 M hydrazine in 1 M NaOH.

The $E_{OCP}$ measurements yield the following $E_{OCP}$ values; −0.65 V using Au and Ag catalyst; and −0.82 V using Cu catalyst, thus showing that a Cu/hydrazine system produces the most negative $E_{OCP}$.

The electro-oxidation process of hydrazine using a Cu catalyst, as compared to Au and Ag catalysts was then tested.

Three different electrodes: Au, Ag and Cu plates (0.5 cm²) were used as catalysts for the electro-oxidation process of hydrazine. The experiments were preformed in an aqueous solution containing 0.4 M hydrazine in 1 M NaOH. The electrochemical measurements were performed by applying a sweep potential, scan rate 50 mV·s$^{-1}$, using Ag/AgCl, KCl saturated, as reference electrode.

The results are presented in FIG. 1.

As shown in FIG. 1, all three tested catalysts show catalytic activity for the electro-oxidation of hydrazine. The oxidation-current in the presence of a Cu catalyst (FIG. 1, curve (b)) appears in a potential above −0.75 V while the oxidation-current in the presence of Ag and Au appears in a potential above −0.65 V (curves (a) and (c), respectively).

Thus, while all electrodes showed catalytic activity for the electro-oxidation of hydrazine, the oxidation current in the presence of a Cu catalyst appears in a more negative potential compared to the Ag and Au catalysts.

In addition, it is shown that the maximum oxidation current achieved by Cu catalyst (at E=−0.45 V) is about 3.5 times higher compared to Au catalyst and about 40 times higher compared to Ag catalyst.

Example 2

A Hydrazine-Based Fuel Cell with an Anode Containing Copper Mesh and Copper Nanoparticles as a Catalyst Layer In a search for electrodes that would produce increased current density, a Cu nanoparticles-containing electrode was prepared, as described hereinabove, by modifying the conventional Cu mesh electrode with nano Cu elements. During this process Cu nanoparticles (or elements) are formed and attached to a Cu mesh electrode.

Figure 3A:
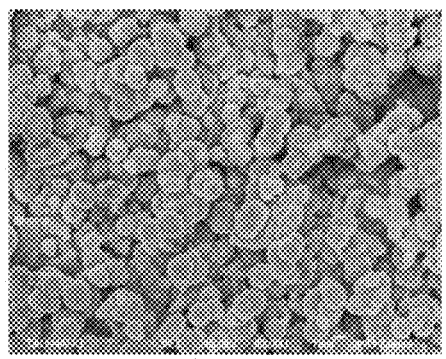
FIGS. 3A-D present SEM images of a Cu nanoparticles-containing electrode (FIGS. 3A and 3B) and a conventional Cu mesh electrode (FIGS. 3C and 3D), according to various embodiments of the invention.
Figure 3B:
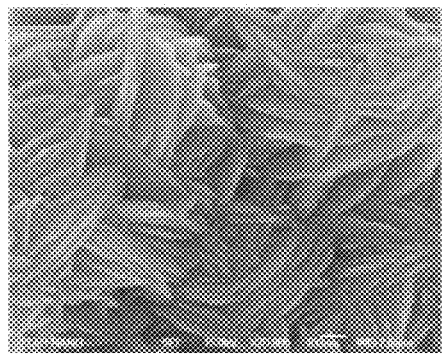
Figure 3C:
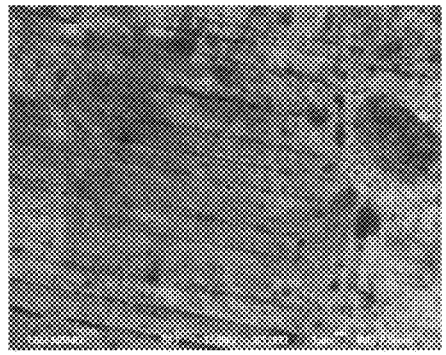
Figure 3D:
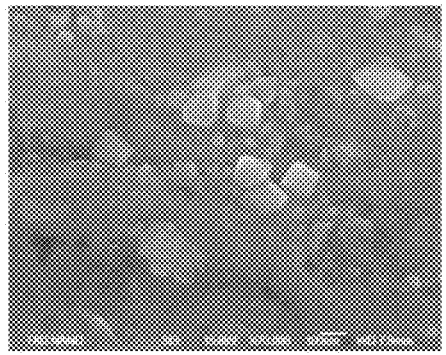

FIGS. 3A-3D present SEM images obtained for the Cu nanoparticles-containing electrode (FIGS. 3A and 3B), as compared to the conventional Cu mesh electrode (FIGS. 3C and 3D).

As shown in FIGS. 3A-3D, while the conventional Cu mesh electrode is characterized by a smooth surface, the Cu nanoparticles-containing electrode is characterized by nano roughness, and consists of microspherical Cu elements (FIG. 3A), shaped as disks, as can be seen in the magnified image (FIG. 3B).

The electro-oxidation process of hydrazine using Cu nanoparticles-containing electrode was compared to conventional Cu mesh electrode. The electro-oxidation process was performed using hydrazine (0.1 M hydrazine in 6 M NaOH), by applying a sweep potential, scan rate 20 mv·s$^{-1}$, using Ag/AgCl, KCl saturated, as reference electrode.

FIG. 4 presents the electro-oxidation process of hydrazine in the presence of a Cu mesh electrode (curve a) and the Cu nanoparticles-containing electrode (curve b), and shows that the highest current is achieved by the Cu nanoparticles-containing electrode (curve a). The oxidation current achieved in the presence of the Cu nanoparticles-containing electrode appears in a potential above −0.85 V while the oxidation current achieved in the presence of the conventional Cu mesh electrode appears in a potential above −0.75 V. In addition, the oxidation current achieved in the presence of the Cu nanoparticles-containing electrode is about 7 times higher at working potential ($E_W$) of −0.7 V, as compared to the conventional Cu mesh electrode.

Thus, it is shown that the Cu nanoparticles-containing electrode produces two important characteristics: an increased catalytic oxidation current and an additional nano catalytic effect, which is reflected by the appearance of oxidation current at a lower potential (e.g., a negative shift of $E_{OCP}$ value ($\Delta E$) of about 100 mV between conventional Cu mesh electrode and Cu nanoparticles-containing electrode, under the same conditions).

The feasibility and stability of the Cu electrodes was examined in a long-term discharge experiment, with a galvanostatic discharge regime of 1 A (50 mA·cm$^2$), using a conventional Cu mesh electrode.

Figure 5A:
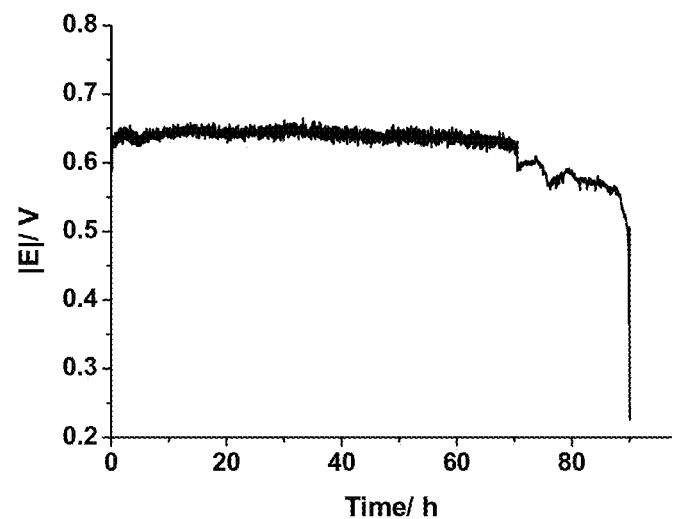
FIGS. 5A-B present exemplary discharge potential curves, observed in long-term experiments, at a galvanostatic regime of 1 A (50 mA·cm$^2$), using Cu mesh electrode (A=20 cm$^2$), 1.0 M hydrazine (33 grams) in 7.5 M NaOH (100 ml), and Ag/AgCl, KCl saturated as reference electrode (FIG. 5A), and at a galvanostatic regime of 0.5 A using folded 10 cm$^2$ Cu-mesh electrode (A=1.25 cm$^2$), about 10 M hydrazine (14.3 grams), in 6 M NaOH solution, and Ag/AgCl, KCl saturated as reference electrode (FIG. 5B).

As shown in FIG. 5A, a stable potential of about 0.62 V was observed throughout the experiment, indicating that a half cell power corresponds to 0.62 W. High discharge efficiency value of 91% was calculated. A discharge efficiency value of 83% was calculated in the same experiment for a galvanostatic regime of 2 A (100 mA·cm$^2$) (data not shown).

The stability of the Cu mesh electrode was further examined during 500 hours at 0.5 A, using folded 10 cm$^2$ Cu-mesh electrode having geometric area A=1.25 cm$^2$ (about 0.3 cm width). This long-term experiment was performed using a starting solution of 9.9 M hydrazine (14.3 grams) in 6 M NaOH (45 ml). Each two days, 20 ml of the fuel composition was removed from the cell and 20 ml of 10.1 M hydrazine (6.5 grams) in 6 M NaOH were added. Ag/AgCl (sat KCl) was used as reference electrode.

Figure 5B:
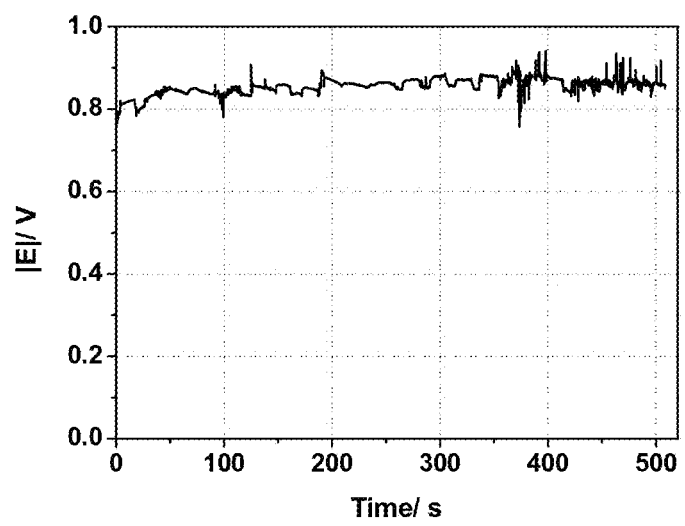

The results are presented in FIG. 5B, and clearly show that the Cu cathode has an outstanding stability after 500 hours.

The discharge efficiency shows that about 4 electrons were consumed in the electro-oxidation process of hydrazine, indicating that a full oxidation of hydrazine was achieved, (see, Equation 1 hereinabove).

The nanocatalytic effect exhibited by the Cu nanoparticles-containing electrode with hydrazine as a fuel, presented herein, has never been described hitherto.

Without being bound to any particular theory, it is suggested that this effect is attributed to the presence of $Cu^{II}$ ($Cu^{2+}$) species, such as $Cu(OH)_2$ and/or CuOOH, on the Cu surface, and that these species act as electron transfer mediating agents. A higher concentration of $Cu^{II}$ species on the surface of a nanoparticles-containing electrode, as compared to conventional mesh electrode, results in the nanocatalytic effect.

As discussed hereinabove, $Cu^{2+}$ ions were shown to act as catalysts of different hydrazine and hydrazine-derivates decomposition reaction. It is also known that hydrazine is a strong reducing agent, which reduces $Cu^{II}$ species to $Cu^0$.

Thus, it is suggested that while hydrazine reduces $Cu^{II}$ species to $Cu^0$, at the same time $Cu^0$ is oxidized in the alkali solution to $Cu^{II}$ species, such that an equilibrium $Cu^0 \leftrightarrow Cu^{II}$ is formed.

In $E_{OCP}$ regime (where no oxidation current is applied) the equilibrium depends upon the hydrazine and hydroxide concentrations. In OCP conditions, [$Cu^{2+}$] on the electrode surface is lower, such that [$Cu^{2+}$]<<[$Cu^0$]. On Cu nanoparticles-containing electrode, the effect is significantly increased, due to the higher surface area of the electrode.

In discharge regime (fuel cell operation conditions), $Cu^{2+}$ appeared. Under discharge conditions, the over-potential observed was about 300 mV and $E_W$ was calculated as about −0.7 V. Under these conditions, the hydrazine concentration on the electrode surface is minimal, because of the electro-oxidation of hydrazine on the Cu electrode, which leads to [$Cu^{2+}$]>>[$Cu^0$].

Still without being bound to any particular theory, it is suggested that the catalytic effect exhibited by Cu includes an automatic regulation of $Cu^{2+}$ on the Cu electrode surface. It is therefore suggested that the nanocatalytic effect exhibited by the Cu nanoparticles-containing electrode described herein, in a hydrazine-based system, is a result of a synergetic effect which corresponds to the higher surface area of the electrode, which results in increased current density, and to the increased level of $Cu^{II}$ species on the electrode, which act as electron transfer mediator catalysts.

Example 3

A Hydrazine Based Fuel Cell with an Organic-Coated Carbon Cloth Electrode and a Cu Mesh Electrode The present inventors have further practiced a fuel cell which contains hydrazine ($N_2H_4$) as fuel and hydrogen peroxide ($H_2O_2$) as oxidant, with a Cu catalyst (mesh or nanoparticles-containing) for electro-oxidation of hydrazine, and a carbon cloth/Ferrocene (C/Fc) catalyst for the electro-reduction of hydrogen peroxide ($H_2O_2$). Such a fuel cell is described as Cu-Hz//$H_2O_2$—C/Fc, and represents an efficient Hz/$H_2O_2$ fuel cell that is devoid of a noble (e.g., precious) metal catalyst. A similar fuel cell, with a Prussian Blue cathode catalyst was also practiced.

These fuel cells are cost-effective and consist of relatively simple catalysts. As demonstrated hereinafter, these fuel cells have significantly improved performance.

The fuel cell described herein was constructed as previously described (see, U.S. Provisional patent application No. 61/230,764, filed Aug. 3, 2009).

Figure 6A:
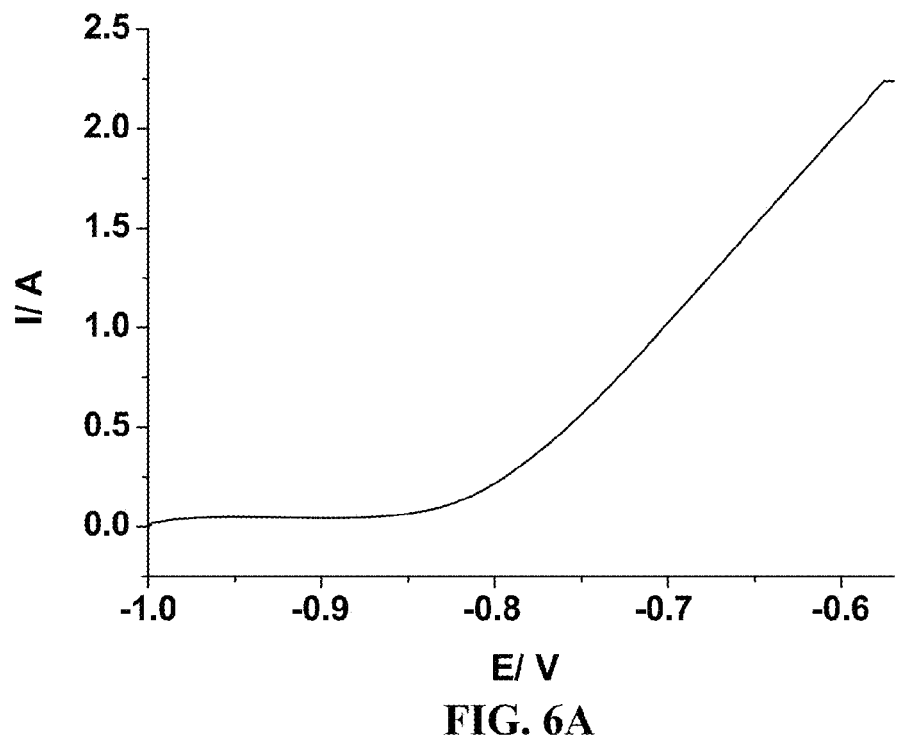
FIG. 6A presents a plot showing the electro-oxidation process of hydrazine using Cu mesh electrode (A=10 cm$^2$), as measured in an experiment performed in 6% w/v hydrazine ($H_2N_2$) in 3 M NaOH, by applying a sweep potential, scan rate 50 mV·s$^{-1}$, using Ag/AgCl, KCl saturated, as reference electrode.
Figure 6B:
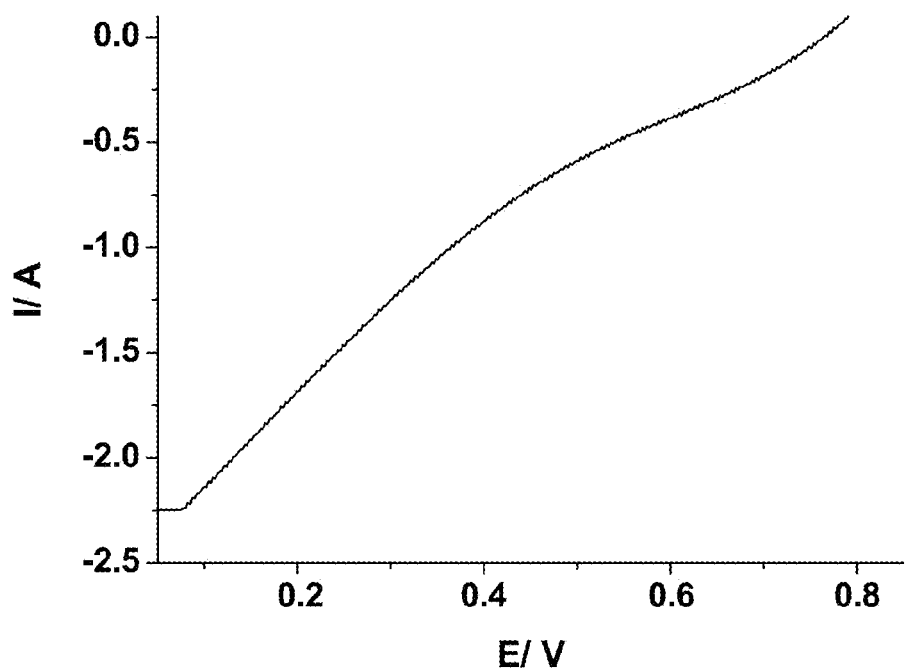
FIG. 6B presents a plot showing the electro-reduction of hydrogen peroxide ($H_2O_2$) using carbon cloth/ferrocene electrode (C/Fc, 100 cm$^2$), as measured in an experiment performed in 6% w/v $H_2O_2$ in a solution containing 3 M $H_2SO_4$ and 0.22 M HCl, by applying a sweep potential, scan rate 50 mV·s$^{-1}$, using Ag/AgCl, KCl saturated, as reference electrode.

The electrochemical properties of the anode and cathode compartments were first investigated, as presented is FIGS. 6A and 6B, respectively.

As shown in FIG. 6A, the electro-oxidation process in the presence of a Cu/Hz anode system produces a high $E_{OCP}$ value of −1.00 V and produces high current of 1 A at a potential of about −0.7 V. As shown in FIG. 6B, the electro-reduction process in the presence of a C/Fc/$H_2O_2$ cathode system produces a high $E_{OCP}$ value of about 0.75 V and a current of 1 A at a potential of about 0.35 V.

Based on these measurements, it is expected that the full cell would produce about 1 V (|$E_A$|+|$E_C$|) at 1 A.

Further stability and reproducibility measurements made for electroreduction of hydrogen peroxide in the presence of a C/Fc cathode are described in U.S. Provisional patent application No. 61/230,764, filed Aug. 3, 2009.

In further experiments, the carbon cloth-ferrocene cathode and the Cu mesh electrode were utilized for constructing a fuel cell presented as:

Cu mesh//$N_2H_4$6% w/v in 3MNaOH (125 ml)||$H_2O_2$6% in 3 M $H_2SO_4$ and 0.22 M HCl (125 ml)//Carbon cloth/ferrocene having an anode surface area of 10 $cm^2$ and a cathode surface area of 100 $cm^2$, and a Nafion membrane 117 as a separator.

Figure 7A:
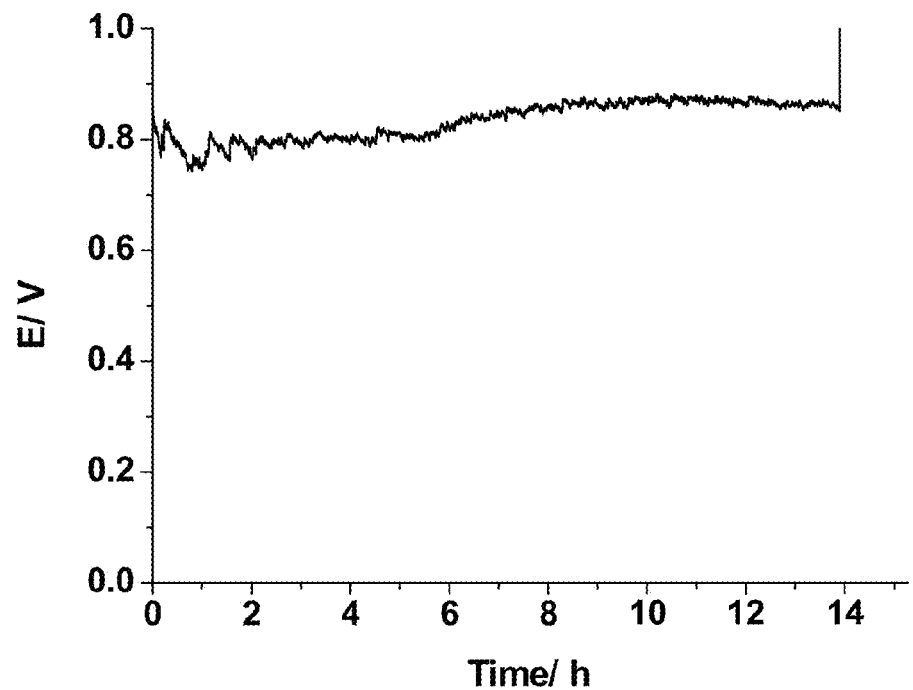
FIGS. 7A-B present full cell measurements for a fuel cell: Cu mesh//3% w/v $N_2H_2$ in 3 M NaOH (125 ml)||$H_2O_2$ 6% in 3 M $H_2SO_4$ and 0.22 M HCl (125 ml)//Carbon cloth/ferrocene, having an anode surface area of 10 cm$^2$ and a cathode surface area of 100 cm$^2$, using Nafion membrane 117 as a separator, according to various embodiments of the invention. Plots represent a galvanostatic discharge potential at a current of 0.25 A (FIG. 7A) and of 0.5 A (FIG. 7B).
Figure 7B:
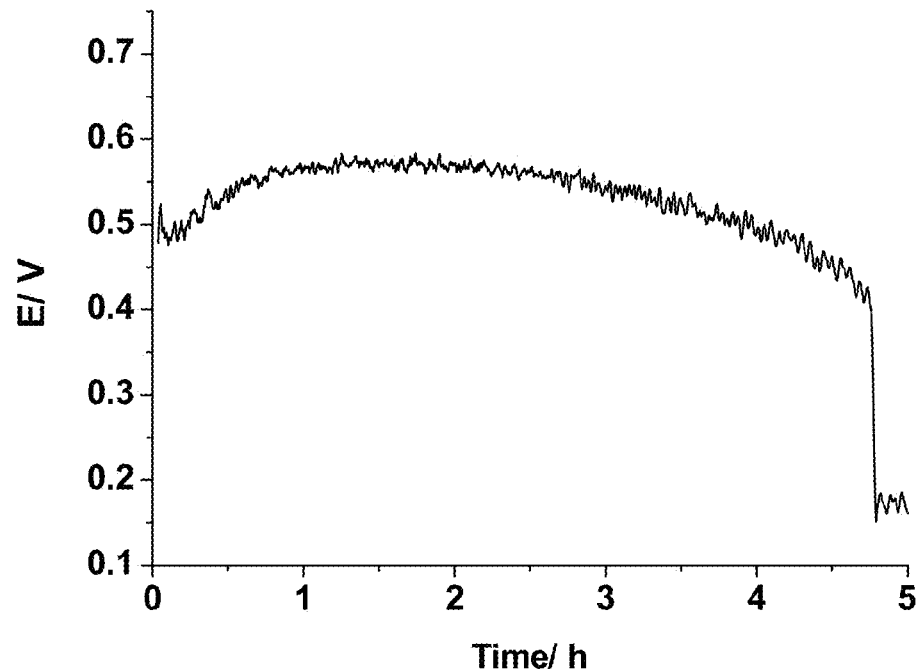

Full cell measurements were performed under a galvanostatic regime of 0.25 A and 0.5 A, as presented in FIGS. 7A and 7B, respectively.

It is noted that experiments were conducted for 14 hours and 5 hours, respectively, with no decrease in the output power during the tested time period due to hydrazine consumption.

The fuel cell produces $E_{OCP}$ of 1.75 V.

In a galvanostatic regime of 0.25 A, the full cell produces a working potential ($E_W$) of about 0.85 V, a power of about 0.21 W and a capacity of 3.5 Ah. In a galvanostatic regime of 0.5 A, the full cell produces a working potential ($E_W$) of about 0.52 V, a power of about 0.26 W and a capacity of 2.3 Ah.

The hydrazine-based fuel cell system described herein, which utilizes Cu anode catalyst, therefore exhibits good electrochemical discharge properties; current and potential (power), which are similar to those obtained with a Pt/hydrazine system (−0.7 V vs. Ag/AgCl) at 1 A and 2 A.

The fuel cell described herein is further characterized by a high level of stability, of up to 90 hours work (for the anode half cell; see, FIG. 5A).

Importantly, no anode poisoning was observed during the process.

Figure 8:
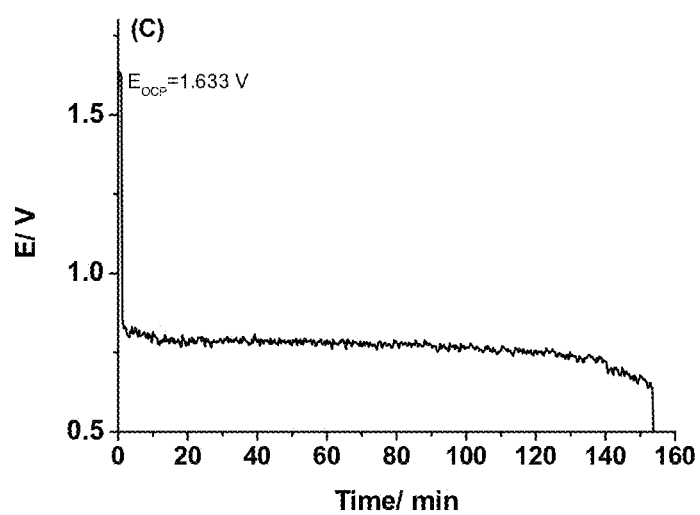
FIG. 8 presents full cell measurements, at a galvanostatic regime of 0.75 A, for a fuel cell: Cu mesh//0.54 M $N_2H_2$ in 4.8 M NaOH (75 ml)||$H_2O_2$ 9% in 10% w/v (65 ml)//Carbon cloth containing Prussian Blue, having an anode surface area of 14 cm$^2$ and a cathode surface area of 170 cm$^2$, using Nafion membrane 117 as a separator, according to various embodiments of the invention.

A similar fuel cell, with a Prussian Blue cathode catalyst was also practiced. FIG. 8 presents a full cell experiment in a galvanostatic regime of 0.75 A (first minute 0 A was applied). The full cell was composed of a Cu mesh electrode (A=14 $cm^2$), and anode electrolyte solution (fuel composition) containing 0.54 M hydrazine in 4.8 M NaOH (75 ml); and of a carbon cloth containing Prussian blue electrode (A=170 $cm^2$) rolled in graphite plate, having a geometrical surface area of about 25 $cm^2$, and a cathode electrolyte solution containing 9% w/v hydrogen peroxide ($H_2O_2$) in 10% w/v sulfuric acid (65 ml).

This hydrazine/hydrogen peroxide fuel cell produces $E_{OCP}$ of 1.633 V in 0.75 A, and a power of 0.6 W. About 44% of the theoretical amount of hydrazine was consumed during the electrochemical reaction.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A fuel cell system comprising an anode compartment, a cathode compartment and a separator interposed between said cathode and said anode compartment comprising an anode compartments, said anode comprising a catalyst layer which consists of copper or a copper alloy, said copper or copper alloy, comprising copper nanoparticles, said catalyst layer being deposited onto a surface of said anode and devoid of a noble metal, the system being operable by a fuel composition comprising a compound having the formula $R_1R_2N-NR_3R_4$, wherein each of $R_1$-$R_4$ is independently selected from the group consisting of hydrogen, alkyl, alkenyl, alkynyl, heteroalicyclic, alkoxy, carboxy, ketone, amide, hydrazide and amine, provided that at least one of $R_1$-$R_4$ is hydrogen.

2. The fuel cell system of claim 1, being operable by contacting said anode compartment with said fuel composition, contacting said cathode compartment with an oxidant, and electrochemically reacting said fuel composition and said oxidant.

3. The fuel cell system of claim 1, wherein said anode compartment is at least partially filled with said fuel composition.

4. The fuel cell system of claim 3, wherein said cathode compartment comprises an oxidant for electrochemically reacting with said fuel composition.

5. The fuel cell system of claim 2, wherein said oxidant is a peroxide.

6. The fuel cell system of claim 2, wherein said oxidant is oxygen.

7. The fuel cell system of claim 1, wherein each of $R_1$-$R_4$ is hydrogen.

8. The fuel cell system of claim 1, wherein said fuel composition further comprises an alkaline aqueous solution.

9. The fuel cell system of claim 8, wherein said alkaline aqueous solution comprises a metal alkali hydroxide.

10. The fuel cell system of claim 9, wherein a concentration of said metal alkali hydroxide ranges from 0.5 M to 6M.

11. The fuel cell system of claim 10, wherein a concentration of said metal alkali hydroxide ranges from 3 M to 6 M.

12. The fuel cell system of claim 8, wherein a concentration of said fuel in said fuel composition ranges from 0.01 M to 1 M.

13. The fuel cell system of claim 1, wherein said separator comprises a solid electrolyte membrane.

14. The fuel cell system of claim 5, wherein said cathode compartment comprises a cathode comprising a catalyst layer deposited on a surface thereof.

15. The fuel cell system of claim 14, wherein said catalyst layer of the cathode comprises a non-metallic substance.

16. The fuel cell system of claim 15, wherein said non-metallic substance is a metal complex.

17. The fuel cell system of claim 16, wherein said metal complex is selected from the group consisting of ferrocene and Prussian Blue.

18. The fuel cell system of claim 2, wherein said oxidant is a peroxide.

19. The fuel cell system of claim 18, wherein said cathode compartment comprises a cathode comprising a catalyst layer which comprises a metal complex.

20. The fuel cell system of claim 2, wherein said oxidant is oxygen.

21. The fuel cell system of claim 1, wherein said cathode compartment comprises a cathode comprising a catalyst layer that comprises a metal complex deposited on a surface of said cathode, the system being operable by contacting said anode compartment with said fuel composition, contacting said cathode compartment with a peroxide as an oxidant, and electrochemically reacting said fuel composition and said oxidant.

22. The fuel cell system of claim 4, exhibiting an open circuit potential ($E_{OCP}$) higher than 1.5 volts.

23. The fuel cell system of claim 4, exhibiting a power output (W) that equals to or in greater than 0.1 Watt.

24. A method of operating a fuel cell system, the method comprising contacting an anode compartment of the fuel cell system with a fuel composition that comprises a compound having the formula $R_1R_2N$—$NR_3R_4$, and, at the same time, contacting a cathode compartment of the fuel cell system with an oxidant, and electrochemically reacting said compound having said general formula $R_1R_2N$—$NR_3R_4$ and said oxidant, wherein said anode compartment comprises an anode having a catalyst layer which consists of copper or a copper alloy, said copper or copper alloy comprising copper nanoparticles, said catalyst layer being deposited on a surface of said anode and devoid of a noble metal, the fuel cell system further comprising a separator interposed between said anode compartment and said cathode compartment, wherein each of $R_1$-$R_4$ is independently selected from the group consisting of hydrogen, alkyl, alkenyl, alkynyl, heteroalicyclic, alkoxy, carboxy, ketone, amide, hydrazide and amine, provided that at least one of $R_1$-$R_4$ is hydrogen.

25. The method of claim 24, wherein said oxidant is a peroxide.

26. The method of claim 25, wherein said cathode compartment comprises a cathode having a catalyst layer that comprises a non-metallic substance deposited onto a surface thereof.

27. The method of claim 24, wherein said oxidant is oxygen.

28. A method of producing an electrical energy, the method comprising electrochemically reacting a compound having the formula $R_1R_2N$—$NR_3R_4$ and an oxidant, wherein said compound having said formula $R_1R_2N$—$NR_3R_4$ is contacted with an anode compartment which comprises an anode having a catalyst layer that consists of copper or a copper alloy, said copper or copper alloy comprising copper nanoparticles, said catalyst layer being deposited onto a surface of said anode and devoid of a noble metal, and said oxidant is contacted with a cathode in a cathode compartment, said anode compartment and said cathode compartment are assembled as a fuel cell system which further comprises a separator interposed between said anode compartment and said cathode compartment, wherein each of $R_1$-$R_4$ is independently selected from the group consisting of hydrogen, alkyl, alkenyl, alkynyl, heteroalicyclic, alkoxy, carboxy, ketone, amide, hydrazide and amine, provided that at least one of $R_1$-$R_4$ is hydrogen.

29. The method of claim 28, wherein said oxidant is a peroxide.

30. The method of claim 29, wherein said cathode comprises a catalyst layer that comprises a non-metallic substance.

31. The method of claim 28, wherein said oxidant is oxygen.

32. A power plant comprising the system of claim 1.

33. A vehicle, fueled by the fuel cell system of claim 3.

34. A method of powering an electricity-consuming device, the method comprising powering the electricity-consuming device with the fuel cell system of claim 3.

35. An electricity-consuming system or device, having incorporated therein the fuel cell system of claim 1.

* * * * *